US007912932B2

(12) United States Patent
Barnes-Leon et al.

(10) Patent No.: US 7,912,932 B2
(45) Date of Patent: *Mar. 22, 2011

(54) SERVICE REQUEST COMMON OBJECT

(75) Inventors: Maria Theresa Barnes-Leon, Fremont, CA (US); Nardo B. Catahan, Jr., S. San Francisco, CA (US); Shailendra Garg, Cupertino, CA (US); Ramaswamy Sundararajan, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1105 days.

This patent is subject to a terminal disclaimer.

(21) Appl. No.: 10/809,927

(22) Filed: Mar. 24, 2004

(65) Prior Publication Data
US 2007/0208878 A1 Sep. 6, 2007

Related U.S. Application Data

(60) Provisional application No. 60/457,305, filed on Mar. 24, 2003.

(51) Int. Cl.
*G06F 15/173* (2006.01)
*G06F 15/16* (2006.01)
*G06F 11/00* (2006.01)
*H04L 12/66* (2006.01)
*G06F 13/42* (2006.01)

(52) U.S. Cl. ........ 709/223; 709/224; 709/226; 709/246; 370/236; 370/252; 370/356; 340/825; 714/39; 714/43

(58) Field of Classification Search .................. None
See application file for complete search history.

(56) References Cited

U.S. PATENT DOCUMENTS

| 4,714,995 | A | 12/1987 | Materna et al. ............... 364/200 |
|---|---|---|---|
| 5,220,500 | A | 6/1993 | Baird et al. .................. 705/36 R |
| 5,311,438 | A | 5/1994 | Sellers et al. .................... 700/96 |
| 5,349,643 | A * | 9/1994 | Cox et al. ........................ 713/155 |
| 5,416,917 | A | 5/1995 | Adair et al. .................... 707/203 |
| 5,446,880 | A | 8/1995 | Balgeman et al. ................ 707/9 |
| 5,566,332 | A | 10/1996 | Adair et al. .................... 707/101 |
| 5,646,862 | A | 7/1997 | Jolliffe et al. ..................... 703/1 |
| 5,699,527 | A | 12/1997 | Davidson ........................ 705/38 |
| 5,708,828 | A | 1/1998 | Coleman ....................... 395/785 |
| 5,724,575 | A | 3/1998 | Hoover et al. .................. 707/10 |
| 5,727,158 | A | 3/1998 | Bouziane et al. ............. 709/225 |

(Continued)

FOREIGN PATENT DOCUMENTS

DE     101 50 391 A1     5/2002

(Continued)

OTHER PUBLICATIONS

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

(Continued)

*Primary Examiner* — Ario Etienne
*Assistant Examiner* — Ho Shiu
(74) *Attorney, Agent, or Firm* — Campbell Stephenson LLP

(57) ABSTRACT

Service request information in a first format for use by a first computerized system is synchronized with the service request information in a second computerized system that utilizes a second format by using an service request common object data model.

32 Claims, 19 Drawing Sheets

U.S. PATENT DOCUMENTS

| | | | | |
|---|---|---|---|---|
| 5,742,588 | A * | 4/1998 | Thornberg et al. | 370/236 |
| 5,758,355 | A | 5/1998 | Buchanan | 707/201 |
| 5,764,543 | A | 6/1998 | Kennedy | 703/2 |
| 5,806,075 | A | 9/1998 | Jain et al. | 707/201 |
| 5,930,156 | A | 7/1999 | Kennedy | 703/6 |
| 5,930,764 | A | 7/1999 | Melchione et al. | 705/10 |
| 5,953,710 | A | 9/1999 | Fleming | 705/38 |
| 5,970,490 | A | 10/1999 | Morgenstern | 707/10 |
| 5,983,194 | A | 11/1999 | Hogge et al. | 705/7 |
| 6,032,136 | A | 2/2000 | Brake et al. | 705/41 |
| 6,053,947 | A | 4/2000 | Parson | 703/14 |
| 6,167,380 | A | 12/2000 | Kennedy et al. | 705/10 |
| 6,178,418 | B1 | 1/2001 | Singer | 707/3 |
| 6,216,130 | B1 | 4/2001 | Hougaard et al. | 707/10 |
| 6,226,649 | B1 | 5/2001 | Bodamer et al. | 707/104.1 |
| 6,233,566 | B1 | 5/2001 | Levine et al. | 705/36 R |
| 6,236,997 | B1 | 5/2001 | Bodamer et al. | 707/10 |
| 6,275,812 | B1 | 8/2001 | Haq et al. | 705/11 |
| 6,336,124 | B1 | 1/2002 | Alam et al. | 715/523 |
| 6,341,289 | B1 | 1/2002 | Burroughs et al. | 707/104.1 |
| 6,343,275 | B1 | 1/2002 | Wong | 705/26 |
| 6,377,952 | B1 | 4/2002 | Inohara et al. | 707/101 |
| 6,385,620 | B1 | 5/2002 | Kurzius et al. | 707/104.1 |
| 6,434,567 | B1 | 8/2002 | De La Huerga | 707/102 |
| 6,463,430 | B1 | 10/2002 | Brady et al. | 707/3 |
| 6,556,950 | B1 | 4/2003 | Schwenke et al. | 702/183 |
| 6,591,260 | B1 | 7/2003 | Schwarzhoff et al. | 702/2 |
| 6,631,382 | B1 | 10/2003 | Kouchi et al. | 707/102 |
| 6,668,253 | B1 | 12/2003 | Thompson et al. | 707/10 |
| 6,681,223 | B1 | 1/2004 | Sundaresan | 707/6 |
| 6,738,975 | B1 | 5/2004 | Yee et al. | 719/310 |
| 6,754,679 | B2 | 6/2004 | Oheda | 707/201 |
| 6,778,651 | B1 * | 8/2004 | Jost et al. | 379/201.01 |
| 6,792,431 | B2 | 9/2004 | Tamboli et al. | 707/102 |
| 6,826,542 | B1 | 11/2004 | Virgin et al. | 705/34 |
| 6,828,963 | B1 | 12/2004 | Rappoport | 345/419 |
| 6,883,004 | B2 | 4/2005 | Bahl et al. | 707/10 |
| 6,889,260 | B1 | 5/2005 | Hughes | 709/246 |
| 6,898,783 | B1 | 5/2005 | Gupta et al. | 717/105 |
| 6,912,719 | B2 | 6/2005 | Elderon et al. | 719/319 |
| 6,944,514 | B1 | 9/2005 | Matheson | 700/98 |
| 6,947,947 | B2 | 9/2005 | Block et al. | 707/102 |
| 6,961,760 | B2 | 11/2005 | Li et al. | 709/219 |
| 6,996,776 | B1 | 2/2006 | Makely et al. | 715/207 |
| 7,013,485 | B2 | 3/2006 | Brown et al. | 726/27 |
| 7,043,687 | B2 | 5/2006 | Knauss et al. | 715/236 |
| 7,062,540 | B2 | 6/2006 | Reddy et al. | 709/217 |
| 7,065,499 | B1 | 6/2006 | Seth et al. | 705/26 |
| 7,085,729 | B1 | 8/2006 | Kennedy et al. | 705/10 |
| 7,099,350 | B2 | 8/2006 | Peterson | 370/465 |
| 7,111,010 | B2 | 9/2006 | Chen | 707/102 |
| 7,111,077 | B1 * | 9/2006 | Starkovich et al. | 709/246 |
| 7,124,112 | B1 | 10/2006 | Guyan et al. | 705/44 |
| 7,133,882 | B1 | 11/2006 | Pringle et al. | 1/1 |
| 7,139,766 | B2 | 11/2006 | Thomson et al. | 707/101 |
| 7,143,100 | B2 | 11/2006 | Carlson et al. | 707/101 |
| 7,162,540 | B2 | 1/2007 | Jasen et al. | 709/242 |
| 7,257,594 | B2 | 8/2007 | Tamboli et al. | 701/101 |
| 7,257,820 | B2 | 8/2007 | Fischer et al. | 719/316 |
| 7,287,041 | B2 | 10/2007 | Barnes-Leon et al. | 707/104.1 |
| 7,337,192 | B2 | 2/2008 | Stark et al. | 707/104.1 |
| 7,349,861 | B1 | 3/2008 | Fischer et al. | 705/7 |
| 7,370,009 | B1 | 5/2008 | Notani et al. | 705/29 |
| 7,412,404 | B1 | 8/2008 | Tenorio | 715/236 |
| 2001/0011245 | A1 | 8/2001 | Duhon | 705/38 |
| 2001/0051907 | A1 | 12/2001 | Kumar et al. | 705/36 |
| 2002/0007343 | A1 | 1/2002 | Oyama et al. | 705/39 |
| 2002/0019765 | A1 | 2/2002 | Mann et al. | 705/11 |
| 2002/0023004 | A1 | 2/2002 | Hollander et al. | 705/22 |
| 2002/0035431 | A1 | 3/2002 | Ell | 702/5 |
| 2002/0035488 | A1 | 3/2002 | Aquila et al. | 705/4 |
| 2002/0040339 | A1 | 4/2002 | Dhar et al. | 705/39 |
| 2002/0085020 | A1 | 7/2002 | Carroll, Jr. | 345/700 |
| 2002/0095456 | A1 | 7/2002 | Wensheng | 709/203 |
| 2002/0116234 | A1 * | 8/2002 | Nagasawa | 705/5 |
| 2002/0123983 | A1 * | 9/2002 | Riley et al. | 707/1 |
| 2002/0138582 | A1 | 9/2002 | Chandra et al. | 709/206 |
| 2002/0169867 | A1 * | 11/2002 | Mann et al. | 709/224 |
| 2002/0174417 | A1 | 11/2002 | Sijacic et al. | 717/147 |
| 2002/0178077 | A1 | 11/2002 | Katz et al. | 705/26 |
| 2002/0184085 | A1 | 12/2002 | Lindia et al. | 705/11 |
| 2002/0184148 | A1 | 12/2002 | Kahn et al. | 705/40 |
| 2002/0188538 | A1 | 12/2002 | Robertson et al. | 705/35 |
| 2003/0018502 | A1 | 1/2003 | Rodriguez | 705/7 |
| 2003/0023580 | A1 | 1/2003 | Braud et al. | 703/3 |
| 2003/0033437 | A1 | 2/2003 | Fischer et al. | 709/310 |
| 2003/0071852 | A1 | 4/2003 | Stimac | 345/810 |
| 2003/0097642 | A1 | 5/2003 | Arai et al. | 716/1 |
| 2003/0131018 | A1 | 7/2003 | Godoy et al. | 707/104.1 |
| 2003/0163597 | A1 | 8/2003 | Hellman et al. | 709/316 |
| 2003/0163603 | A1 | 8/2003 | Fry et al. | 709/328 |
| 2003/0229529 | A1 | 12/2003 | Mui et al. | 705/8 |
| 2004/0015515 | A1 | 1/2004 | Beisiegel et al. | 707/103 Y |
| 2004/0034661 | A1 | 2/2004 | Barron et al. | 707/104.1 |
| 2004/0039576 | A1 | 2/2004 | He et al. | 705/1 |
| 2004/0093351 | A1 | 5/2004 | Lee et al. | 707/104.1 |
| 2004/0122826 | A1 | 6/2004 | Mackie | 707/100 |
| 2004/0128188 | A1 | 7/2004 | Leither et al. | 705/11 |
| 2004/0162773 | A1 | 8/2004 | Del Rey et al. | 705/36 |
| 2004/0199536 | A1 | 10/2004 | Barnes-Leon et al. | 705/26 |
| 2004/0215503 | A1 | 10/2004 | Allpress et al. | 705/11 |
| 2004/0249854 | A1 | 12/2004 | Barnes-Leon et al. | 703/103 Y |
| 2005/0021383 | A1 | 1/2005 | Fliess et al. | 705/8 |
| 2005/0021391 | A1 | 1/2005 | Lu et al. | 705/11 |
| 2005/0091249 | A1 | 4/2005 | Hanson et al. | 707/101 |
| 2005/0160361 | A1 | 7/2005 | Young | 715/513 |
| 2005/0197880 | A1 | 9/2005 | Walsh et al. | 705/8 |
| 2006/0271446 | A1 | 11/2006 | Barnes-Leon et al. | 705/26 |
| 2007/0033531 | A1 | 2/2007 | Marsh | 715/738 |
| 2007/0203710 | A1 | 8/2007 | Habichler et al. | 705/1 |
| 2007/0208577 | A1 | 9/2007 | Barnes-Leon et al. | 705/1 |
| 2007/0208878 | A1 | 9/2007 | Barnes-Leon et al. | 709/246 |
| 2007/0214020 | A1 | 9/2007 | Srinivasan et al. | 705/4 |
| 2007/0214063 | A1 | 9/2007 | Kahlon et al. | 705/28 |
| 2007/0214064 | A1 | 9/2007 | Kahlon et al. | 705/28 |
| 2007/0214065 | A1 | 9/2007 | Kahlon et al. | 705/28 |
| 2007/0225949 | A1 | 9/2007 | Sundararajan et al. | 703/2 |
| 2007/0226037 | A1 | 9/2007 | Garg et al. | 705/1 |
| 2007/0226049 | A1 | 9/2007 | Muralitharan et al. | 705/11 |
| 2007/0226093 | A1 | 9/2007 | Chan et al. | 705/38 |
| 2007/0250408 | A1 | 10/2007 | Barnes-Leon et al. | 707/100 |
| 2007/0250419 | A1 | 10/2007 | Kumar et al. | 705/34 |
| 2007/0265944 | A1 | 11/2007 | Catahan, Jr. et al. | 705/30 |

FOREIGN PATENT DOCUMENTS

| | | |
|---|---|---|
| JP | 2001 256308 | 9/2001 |
| WO | WO 0143031 A1 | 6/2001 |
| WO | WO 01/88759 A1 | 9/2001 |
| WO | WO 03/003641 A2 | 1/2003 |

OTHER PUBLICATIONS

Hardwick, Martin, David L. Spooner, Rom Rando, and K.C. Moths, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage enritched ifnormation across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group. "Guidelines for using XML for Electronic Data Interchange." Presented at XML One-San Jose, Sep./Oct. 2001. Downloaded from http://web.archive.org/web/20040413182700/http://www.xmledi-group.org/.

Kappelhoff, Ralph, "Integration of ERP to the Final Control Elements;" ISA Transactions; 1998; vol. 36, No. 4; pp. 229-238. Downloaded from http://www.sciencedirect.com.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp?

Routledge et al., UML and XML Schema, 2002, pp. 1-10.

Walter J. Savitch, Java an Introduction to Computer Science & Programming, 2000, p. 478.

Walter J. Savitch, Java an Introduction to Computer Science & Programming, 2000, pp. 458-467.

Walter J. Savitch, Java an Introduction to Computer Science & Programming, 2000, p. 1.

* cited by examiner

SERVICE REQUEST COMMON OBJECT

CROSS REFERENCE TO RELATED APPLICATIONS

This application claims the benefit of U.S. Provisional Patent Application No. 60/457,305 filed Mar. 24, 2003, entitled, "SERVICE REQUEST COMMON OBJECT," by Barnes et al., and which is hereby incorporated by reference in its entirety.

TECHNICAL FIELD

The present invention is directed to the field of data modeling in the context of enterprise resources planning and customer relations management, and more specifically to service request management.

BACKGROUND

Many enterprise systems use call centers to interface with customers. Such call centers may use call center business processes to process customer requests. An example of a customer request is a request for service or "service request".

For example, assume that a customer calls to report a loss of service. A loss of service is also referred to herein as a network outage. Call center agents face a challenge to manage customer service requests and the network outages in the shortest amount of time. The call center is referred to as the front-office.

Typically, network outages are managed by a network operations center (NOC). The network operations center is referred to as the back-office. Further, the individuals who act as call center agents are distinct from the individuals in the network operations center. The two groups typically do not communicate with each other. In addition, the call center and the network operations center, each use different applications. For example, the call center agents use a call center application in the call center's computerized system to record customer technical problems as service requests. On the other hand, the network operations center uses technical applications such as a network management system in the network operation's computerized system to detect and fix problems such as network outages.

Typically, the call center applications are not linked to the network management systems. Although the network management system can detect and recognize a network outage, such information is usually not communicated to the call center agents and the call center applications. Therefore, when a customer contacts the call center to report a loss of service, the call center is usually not aware of the network outage. In response to a customer's complaint regarding the network outage, the call center agent collects the network outage information as a ticket and sends the ticket to the appropriate individuals to resolve the ticket.

Thus, a mechanism is needed to synchronize the information associated with service requests and network outages between the front-office applications, e.g., the call center applications, with the back office applications, e.g., the network management system applications.

Generally, in order for front-office computerized systems to communicate with back-office computerized systems or vice versa, the user must manually regenerate data from the back-office computerized systems in forms usable by the front-office computerized systems, and vice versa. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated approach for synchronizing data used by a back-office computerized system with data that is use by a front-office computerized system, and vice versa, is needed.

DETAILED DESCRIPTION

Figure 1A:
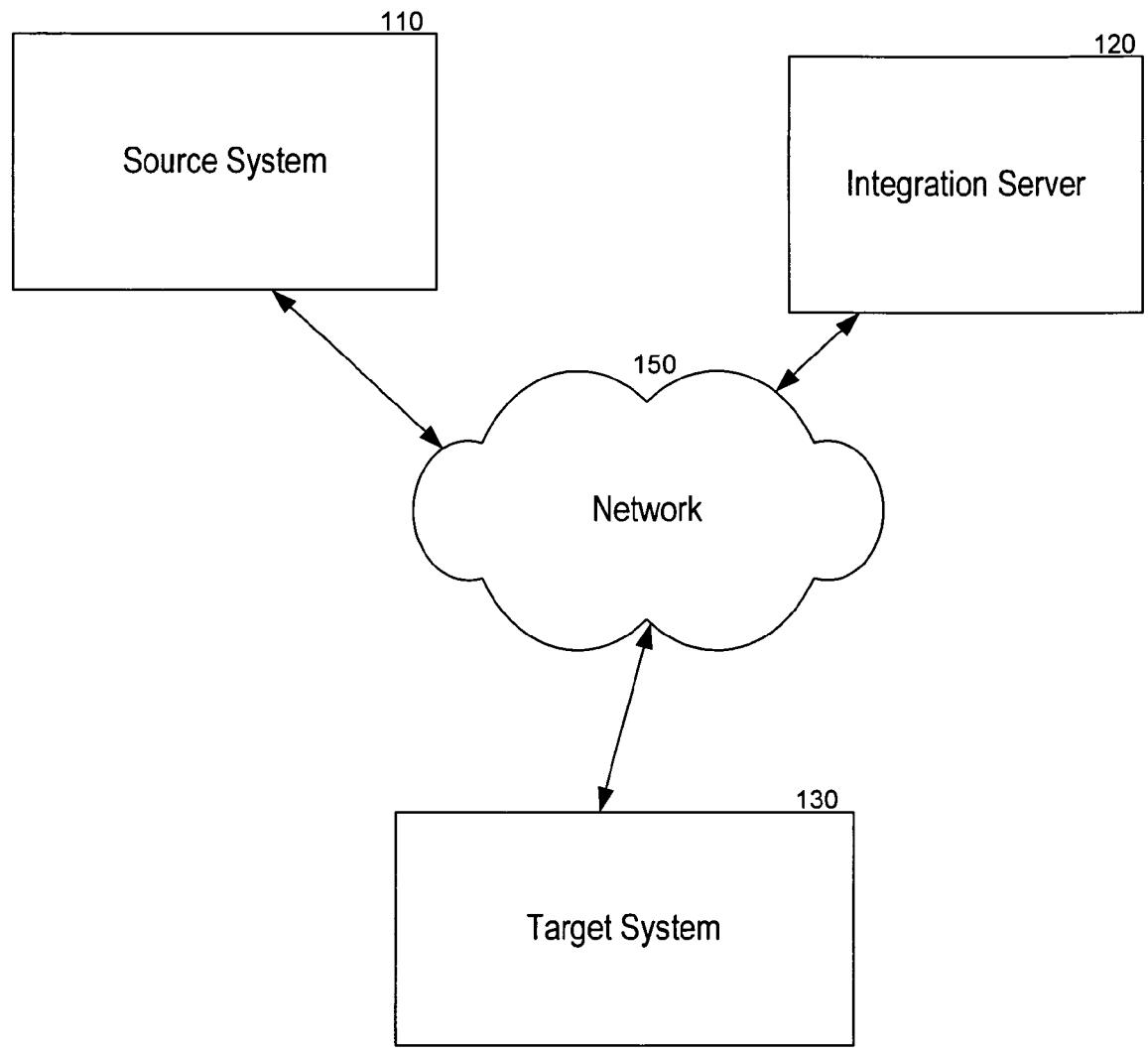
FIG. 1A is a high level network diagram showing aspects of a computerized environment in which the facility operates, according to certain embodiments.

When a customer contacts the call center to report a loss of service, the call center is usually not aware of the network outage because the call center applications are not linked to the network management systems. Although the network management system can detect and recognize a network outage, such information is usually not communicated to the call center agents and the call center applications. A more proactive method would be to synchronize the service request information and network outage information by linking the network management system applications to the call center applications.

The synchronization operation provides users associated with the call center and network operations the same view of customer service requests and network outage information across the various computer applications. All changes in the customer service requests and the network outage information need to be captured and made accessible to all relevant computer applications in the enterprise system. The computer applications of the front-office system uses a data model that is distinct from the data model used in back-office system's computer applications. Thus, a common data storage model is needed so that the various computer applications across the enterprise system can share the service request information and network outage information.

According to certain embodiments, the front-office applications such as the call center applications can be linked to the back-office applications such as the network operations applications by using a data model that includes a service request common object.

If the network management system applications are linked to the call center applications using a service request common object, then when a network outage occurs, the network management system can communicate with the call center. For example, the network management system can request that a service request be opened in the call center application. If a customer calls to report the network outage, the call center agent would be able to verify the customer's outage and report the current activity on the opened service request.

Call centers may use certain call center business processes to process customer requests. Such call center business processes may enable a call center agent to perform the following:
1) initiate or create a service request in a multi-application integration system (MAIS);
2) capture the details of the service request
3) verify entitlements;
4) research and resolve the service request;
5) escalate service requests (if necessary);
6) create customer orders (if necessary); and
7) close service request.

A software facility (hereafter "the facility") for automatically synchronizing service request information, is described. In some embodiments, the facility converts service request information from a form used by the source system to a form used by the target system. In certain embodiments, source systems may be front-office systems such as customer call centers. In certain embodiments, target systems may be back-office system providing support for network operations. However, the network operations center may need to initiate service request information, then the network operations center is referred to as the source system and the call center becomes the target system.

In some embodiments, such as embodiments adapted to converting service request information in the first source format, the facility converts service request information by converting the service request information that is in the first source format into an intermediate format. The intermediate format is then used to convert the service request information into the target format.

By performing such conversions, embodiments of the facility enable a user of a first computerized system who has stored service request information in a first format for use by the first computerized system to readily make the stored service request information available for use in a second computerized system that utilizes a second format in a cost-efficient and time-efficient manner.

FIG. 1A is a network diagram showing aspects of a typical hardware environment in which the facility operates. FIG. 1A shows a source system 110, a target system 130, an integration server 120 and a network 150. Source system 110 stores service request information in a source format. There may be more than one source system. Target system 130 stores service request information in a target format. Target system 130 is described in greater detail herein, with reference to FIG. 1B.

The facility (not shown) converts some or all service request information that is in the source format into the target format by using an intermediate format of the service request information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 1B:
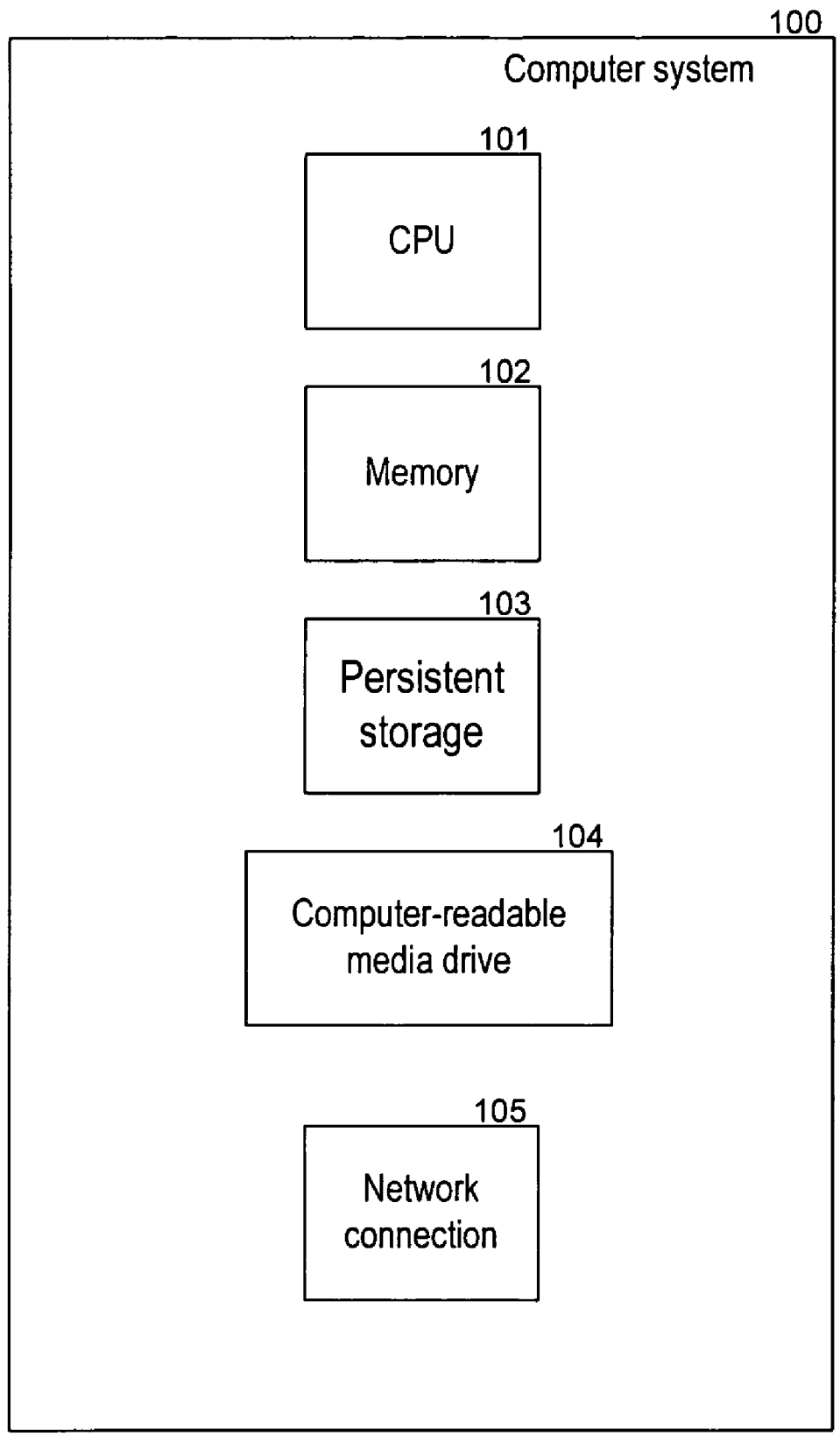
FIG. 1B is a block diagram showing some of the components typically incorporated in at least some of the computer systems and other devices on which the facility executes.

FIG. 1B is a block diagram showing some of the components typically incorporated in at least some of the computer systems and other devices on which the facility executes, including some or all of the server and client computer systems shown in FIG. 1A. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform service request information from a number of different source systems and from a number of different source software packages to a number of target systems and/or to a number of target software packages.

Figure 2:
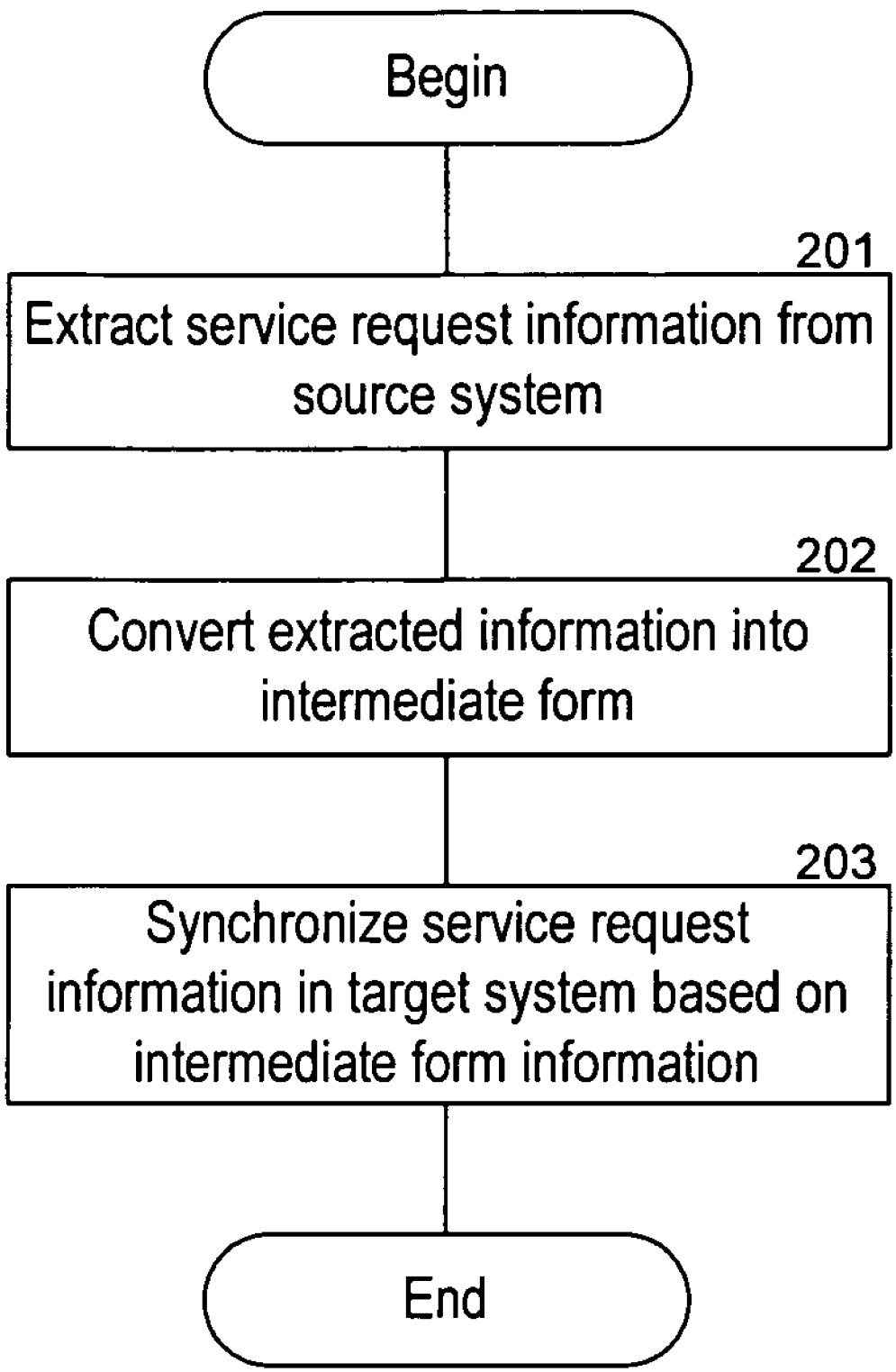
FIG. 2 is a high level flow diagram that shows some steps typically performed by the facility in order to convert service request information from the one or more source formats to the target format.

FIG. 2 is a high level flow diagram that shows some steps typically performed by the facility in order to convert service request information from the one or more source formats to the target format. At block 201, the facility extracts service request information from one or more source systems. At block 202, the facility converts the extracted information into an intermediate format. The intermediate format is described in greater detail herein, with reference to the common object data model. At block 203, the facility synchronizes the service request information from the source system with that of the target system by converting the service request information in intermediate format into the target format. After block 203, the steps as shown in FIG. 2 conclude.

The steps shown in FIG. 2 may be repeated periodically, either to convert service request information that is changed in the source system since the last conversion, and/or to convert one or more particularly selected service request information. The facility may perform conversions from various source systems on which is executing various source software packages, and/or convert service request information to various target systems executing different target software packages.

Efficiency of the service request capture and resolution may be measured with the following indicators: 1) number of service requests (by area, by customer, by severity, by source, etc.), 2) open service requests by time to resolve, by owner, by account, by age, etc., 3) number of closed service requests by time to resolve, by account, by area, by time period (month, week, day), etc.

Figure 3A:
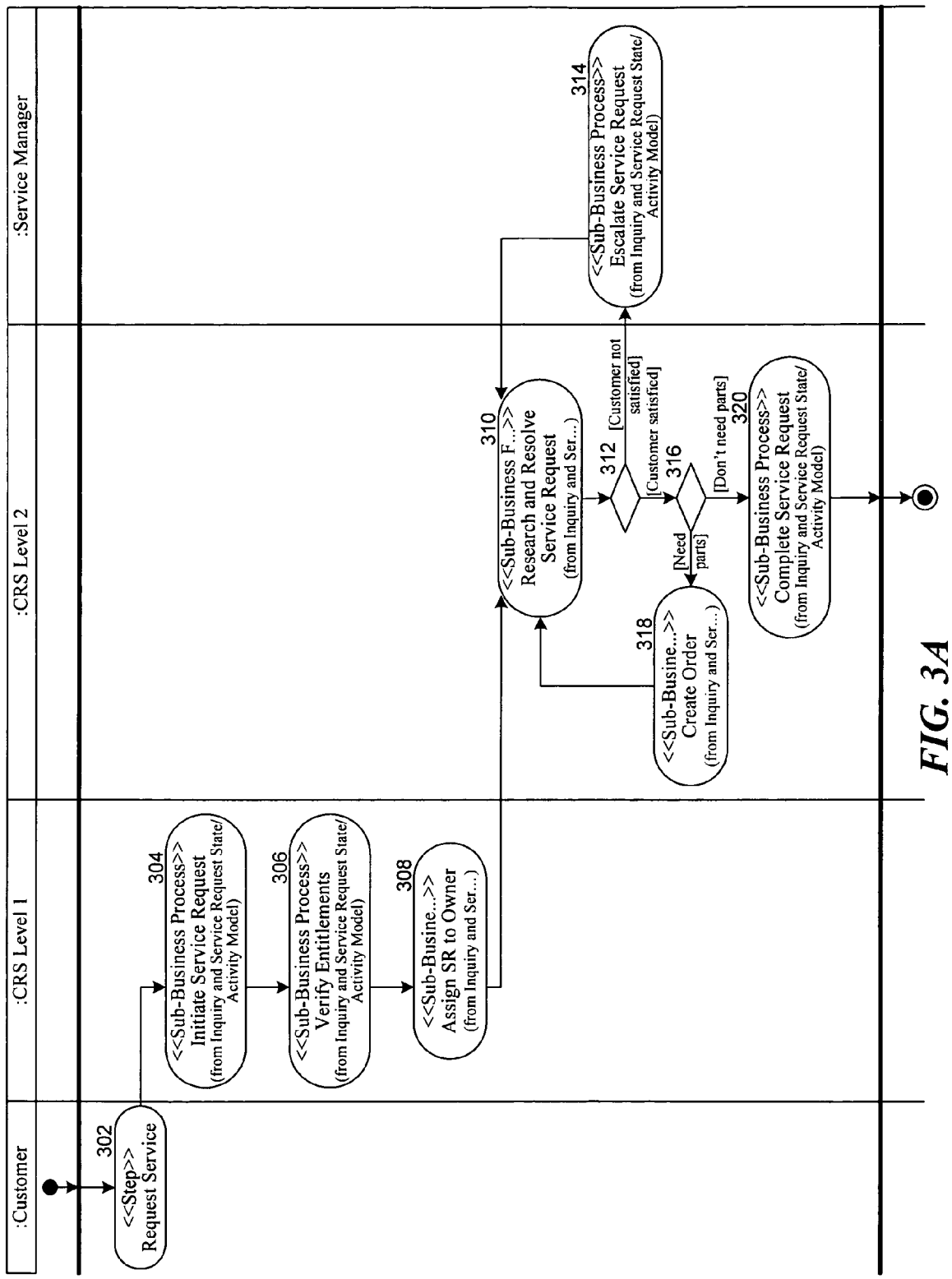
FIG. 3A illustrates some a process flow for fulfilling a service request.

FIG. 3A illustrates some a process flow for fulfilling a service request. At block 302, the customer reports a service issue to a customer service representative over the phone. The customer service representative identifies the customer and inquires if the call is regarding a new or existing issue. a customer service representative investigates a service request in response to a customer calling into the call center. If the customer is new, then a new contact is created for the customer before proceeding with the call.

At block 304, the customer service representative issues queries to see if there are any existing open service requests for this customer. If the service issue is related to an existing service request then the customer service representative provides status to the customer and updates the service request with any new information provided by the customer. If the service issue is not related to any service request, then a new service request is created and all details are entered for this new service request.

At block 306, the customer service representative verifies if the customer is entitled to receive the service associated with the service request. If the customer is not entitled to receive service, then the agent informs the customer about the same and transfers the call to a sales order agent to order a service agreement.

At block 308, if the customer is entitled, then the customer service representative either takes ownership of the service request or assigns the service request to the appropriate person who can work on the service request.

At block 310, the customer service representative researches the service request and attempts to resolve the service request. At block 312, the customer service representative determines whether the customer is satisfied with the resolution of the service request. If the customer is not satisfied with the solution, or if the issue is not resolved within the commit time, then at block 314, the customer service representative attempts to escalate the service request by contacting the appropriate departments. If it is determined that the customer is satisfied, then at block 316, the customer service representative determines whether the resolution of the service request requires delivery of parts to the customer. If it is determined that parts are to be delivered, then at block 318, the customer service representative creates an order for the needed parts. Otherwise, if parts are not needed then at block 320, the service request is completed.

Figure 3B:
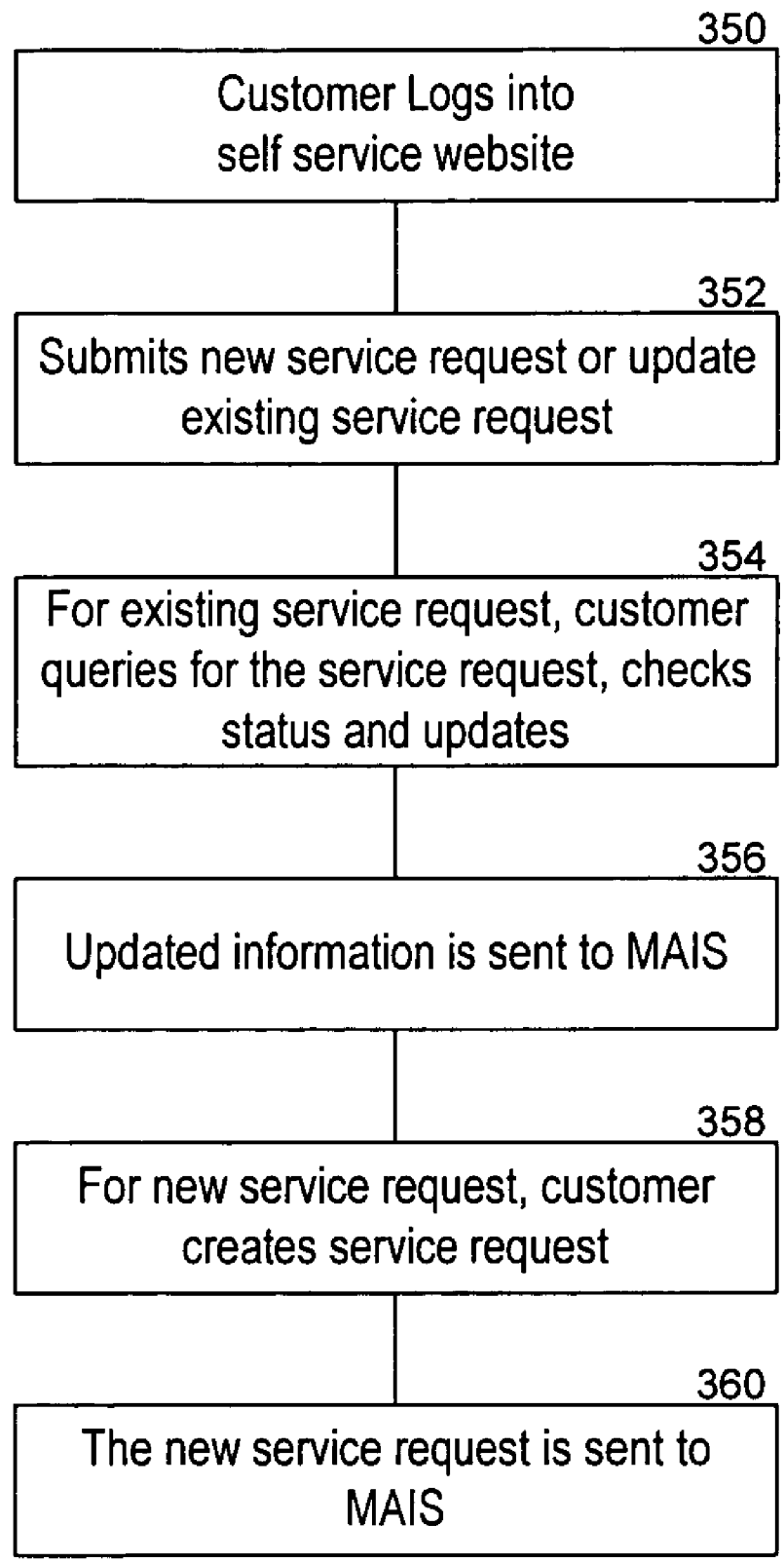
FIG. 3B illustrates a process flow for an online self-service to obtain service requests.

FIG. 3B illustrates a process flow for an online self-service to obtain service requests. An online self-service business process enables customers and partners to create, update, track, and sometimes resolve their service requests online. At block 350, the customer logs into the self-service web site. At block 352, the customer either submits a new service request or updates an existing service request.

At block 354, for an existing service request the customer queries for the service request, checks the status, and updates the service request with new information. At block 356, the updated information is sent to the MAIS to update the corresponding service request.

At block 358, for a new service request the customer creates a service request and fills in the details. At block 360, the new service request information is sent to the MAIS to create the service request.

Figure 4:
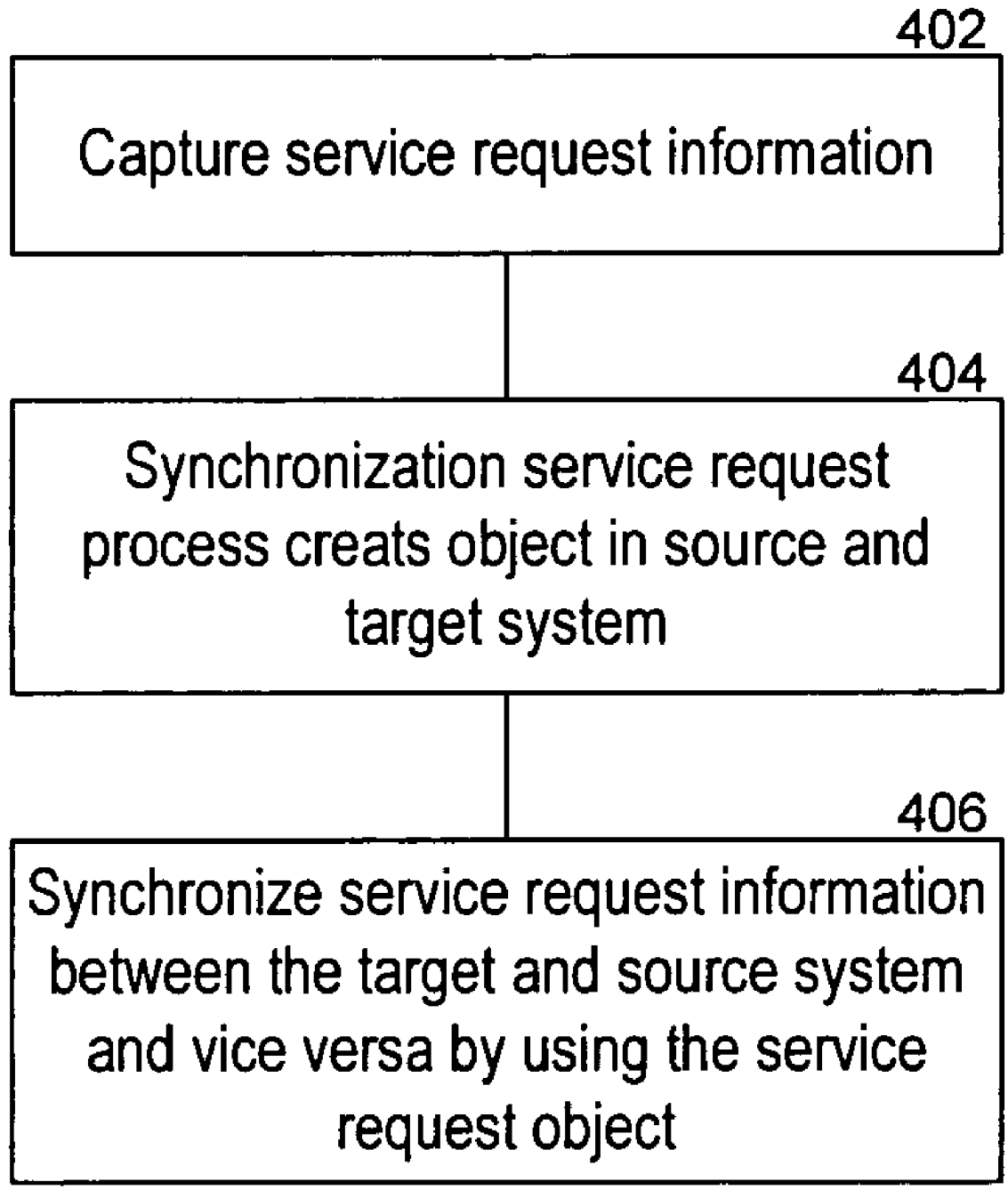
FIG. 4 illustrates an integration business process (IBP) for Synchronizing service request information between the source and target systems.

FIG. 4 illustrates an integration business process (IBP) for Synchronizing service request information between the source and target systems. At block 402, when a customer calls about a new service issue, the customer service representative captures the details of the service issue by creating a new service request. At block 404, this service request information is used to create a service request object that is referred to by both the source and target systems using the synchronization service request process. During the course of resolution of a service request, the service request information undergoes several modifications including addition of new activities, changes to status, owners, commit time, area, sub-area, addition of solutions/resolution documents, etc. At block 406, the synchronization service request process synchronizes the target system with the latest updated information from the source system (MAIS) and vice versa by using the service request object.

The primary variables of a service request object are: 1) contact, 2) account, 3) asset or product. When the service request is created, the service request is linked to one or more of the above primary variables. Additionally, variables such as severity, area, sub-area, summary, description, etc., may be passed. If the service request already exists, then the IBP updates all of the service request variables/fields that changed since the last update or creation of the service request. Table 1 summarizes some of aspects associated with the service request object and synchronization service request process.

TABLE 1

| | |
|---|---|
| Type | Send |
| Mode | Asynchronous |
| Sender Application | MAIS applications, Micromuse, Remedy |
| Receiver Application | Micromuse, Remedy, MAIS applications |
| VBC or Data Replication | Data Replication |
| Primary Actor | Customer Service Representative, Automatic events (Micromuse) |
| Supporting Actors | Service manager, external (target) applications |
| Precondition | All Contact, Account, Asset, and Product information that exist in MAIS should be synchronized with external (target) systems and Vice Versa. |
| Minimal Guarantees | MAIS to external (target) system: A Service request is created in the external system even if Account and Contact details cannot be found. If the service request already exists, then at least the key fields/records such as commit time, Area, Sub-area, Owner, Status, activities within a service request, are updated. External (target) system to MAIS: A Service request is created in MAIS even if Account and Contact details cannot be found. If the service request already exists, then at least the key fields/records such as commit time, Area, Sub-area, Owner, Status, activities within a service request, are updated. |
| Success Guarantees | MAIS to external (target) system: A Service request is created/updated in the external system with all details such as account, contact, activities, etc., populated or updated. External system (target) to MAIS: A Service request is created/updated in MAIS with all details such as account, contact, activities, etc., populated or updated. |
| Trigger | Information should be sent out after a record is saved in the database |
| Condition | Area = "Network" if the target application is Micromuse. This should be configurable by the MAIS administrator. No conditions if Remedy is the target application. |
| Post Step | None |
| MAIS BO | Service Requests |
| Package Size | One Service Request and all the relevant details |
| Master Data Dependencies | Account, Contact, Products, Activities, Assets, Solutions |
| Remote data requirement | Service Requests should be set in mode "To be submitted" which should happen when users connects to the network |
| Send | List of Service Requests Account Info Contact Info service request Information (Area, Sub-area, Status, etc.) Asset Information Product Info Activities Type, Description, owner, etc. Audit Trail Info on all changes |
| Receive Comments | None. |

Once an service request is created or updated and saved in MAIS, the same information is sent to the external (target)

system to create or update the same service request. With respect to the process flow from the external (target) system to MAIS, once a trouble ticket or service request is created or updated in the external (target) system or an event is triggered, information is sent to MAIS to create or update the service request.

The Service Request Common Object includes the following information:

- Service request number: System generated alpha-numeric code that identifies a service request uniquely.
- Account Name: Name of the account that the service request belongs to.
- Site: Location of the account.
- Summary: Brief description of reasons for logging a service request.
- Description: Detailed description or explanation of the customer problems, issues, etc., which requires assistance.
- Contact last name: Last name of the contact that logged the service request.
- Contact first name: First name of the contact that logged the service request.
- Status: Indicates the current status of the service request (Open, Closed, Pending, etc.).
- Sub-status: Indicates the current sub-status of the service request based on the status selected. For example, potential sub-status values could be "Waiting for info", "More info needed", etc., for status="Open".
- Source: Indicates the channel (Phone, Web, Email, etc.) through which the service request was logged.
- Area: Identifies the category (Hardware, Software, Network support, etc.) that the service request belongs to.
- Sub-area: Identifies the sub-category within a category.
- Priority: Customer's rating or ranking (Very high, High, Medium, etc.) that identifies the degree of customer's importance in resolving the service request.
- Severity: Customer service center's ranking of the service request based on its own assessment.
- Owner: Employee ID of the person that is responsible for resolving the service request.
- Time Opened: System time stamp when the service request was opened.
- Time Closed: System time stamp when the service request was closed.
- Time Committed: Indicates a point in time before which the customer should be responded to in resolving the service request.
- Product: Indicates the product that is associated with the service request.
- Part number: Manufacturer's code for identifying the product associated with the service request.
- Asset number: Internal company code that uniquely identifies the product associated with the service request.
- Profile: List of external products that could have potential interactions with the product identified above.

Thus, the service request common object provides a unique, flexible, common data structure to represent various types of service requests for most industries. The service requests can be assigned to any organization, person or business unit. The service request common object also carries information about Parent Area, Sub Area, Product & environment data, Asset Number and Status/Priority codes. List of all activities performed (internal and published) can also be transferred using the service request common object.

The service request can be associated with various Contacts, Owners, Organization. The Service request can also be associated with either Product or Installed Product. Also, environment information can be communicated using External Product and or External Installed product.

FIG. 5 to FIG. 17 are data structure diagrams of the service request common object model. Such a service request common object model illustrates sample intermediate data structure that can contain information to be synchronized between the source and target systems.

Figure 5:
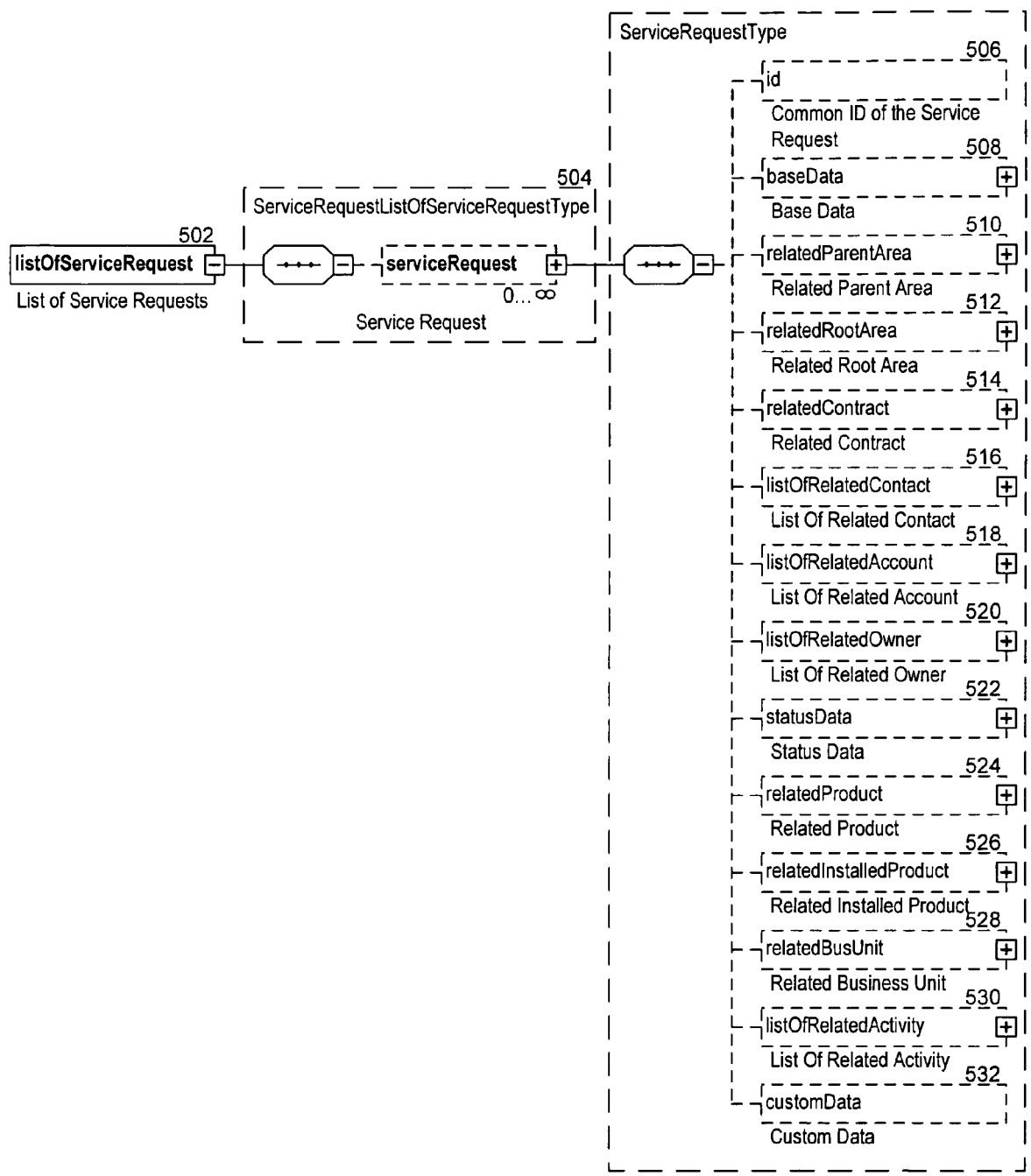
FIG. 5 to FIG. 17 are data structure diagrams of the service request common object model.

FIG. 5 is a block diagram that illustrates the components of a service request object as described herein. In FIG. 5, the service request common object includes a list of service request element 502, which in turn includes any number of service request components 504. The service request common object has a basic Type called ServiceRequestType as shown in the following figure. ServiceRequestType contains components of service request common object such as:

- Common Id 506;
- Base Data 508;
- Related parent Area 510;
- Related Root area 512;
- Related Contract 514;
- List of Related Contacts 516;
- List of Related Account (Customer) 518;
- List of Related Owner 520;
- Status Data 522;
- Related Product (both Internal and External) 524;
- Related Installed Product (Customer Asset) 526;
- Related Business Unit 528;
- List of Related Activity 530; and
- Service request custom data 532.

Figure 6:
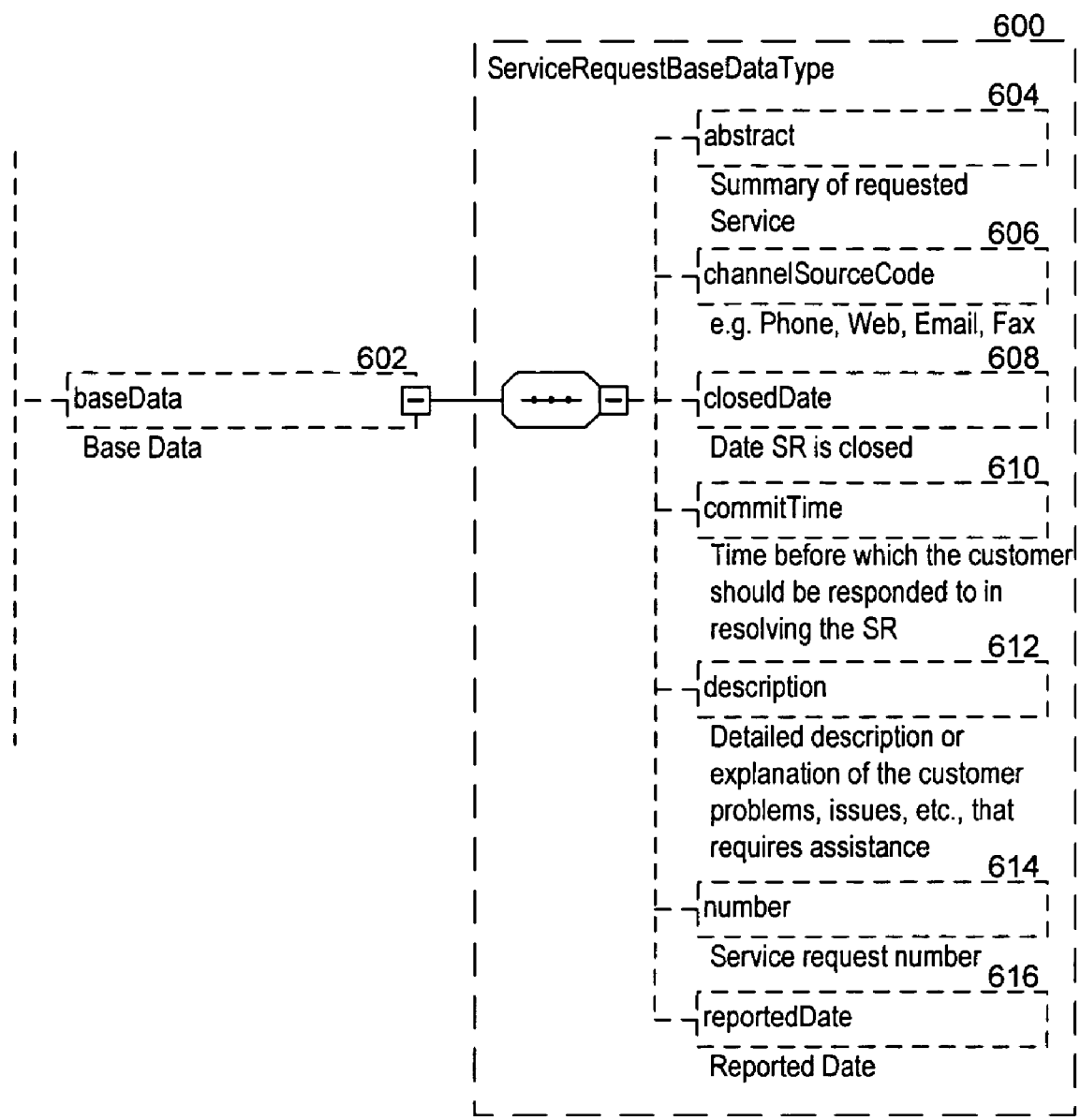

In FIG. 6, the illustrated intermediate data structure 600 is of type service request base data. Base data 602 may include the following components:

- Abstract 604 (summary of requested service);
- Channel source code 606 (e.g. phone, web, email, fax, etc.);
- Closed Date 608 (date when service request is closed);
- Commit time 610 (time before which to respond to the customer for resolving the service request);
- Description 612 (detailed description or explanation of the customer problems, issues, etc., which require assistance);
- Number 614 (service request number); and
- Reported date 616.

Figure 7:
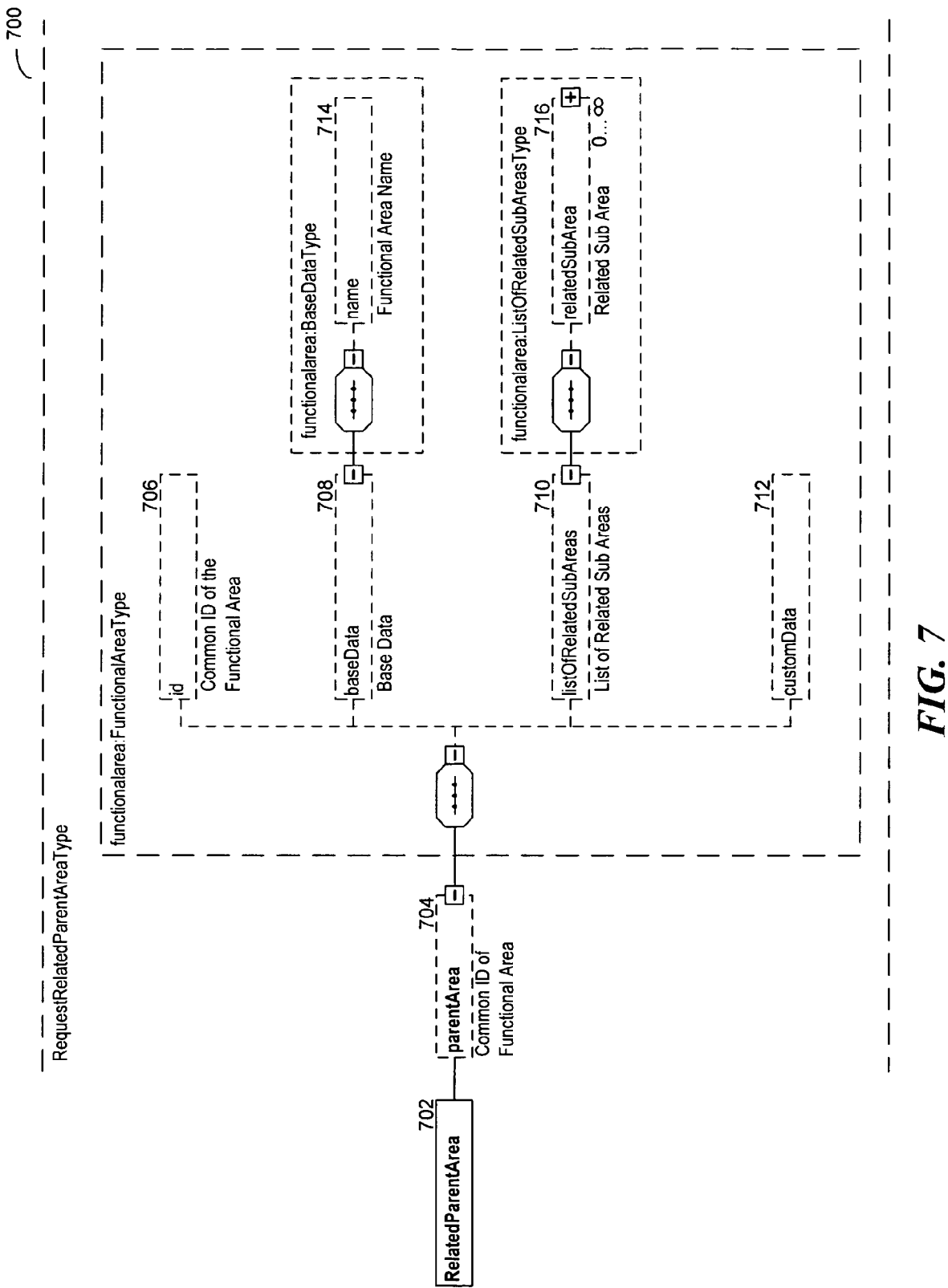

In FIG. 7, the illustrated intermediate data structure 700 is of type service request related parent area. Service request related parent area 702 includes a parent area component 704, which in turn may include the following components:

- ID 706 (common ID of the functional area);
- Base data 708 that can include a functional area name 714;
- List of related sub-areas 710 that can include any number of related sub-areas 716; and
- Functional area custom data 712.

Figure 8:
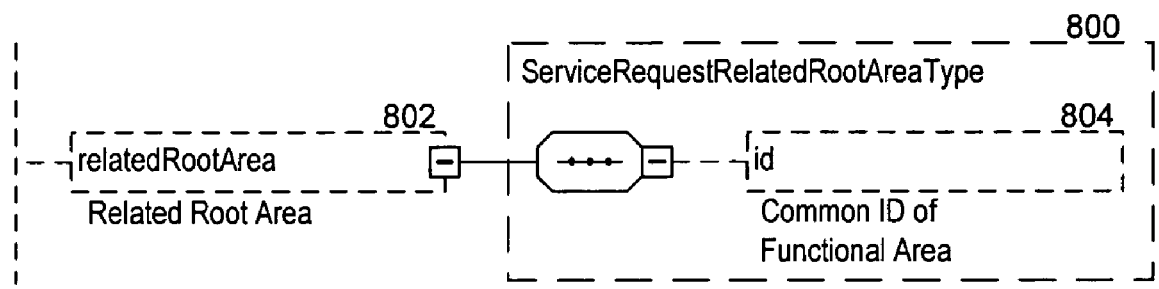

In FIG. 8, the illustrated intermediate data structure 800 is of type service request related root area. Service request related root area 802 includes an ID component 804, which is the common ID of the functional area of the service request.

Figure 9:
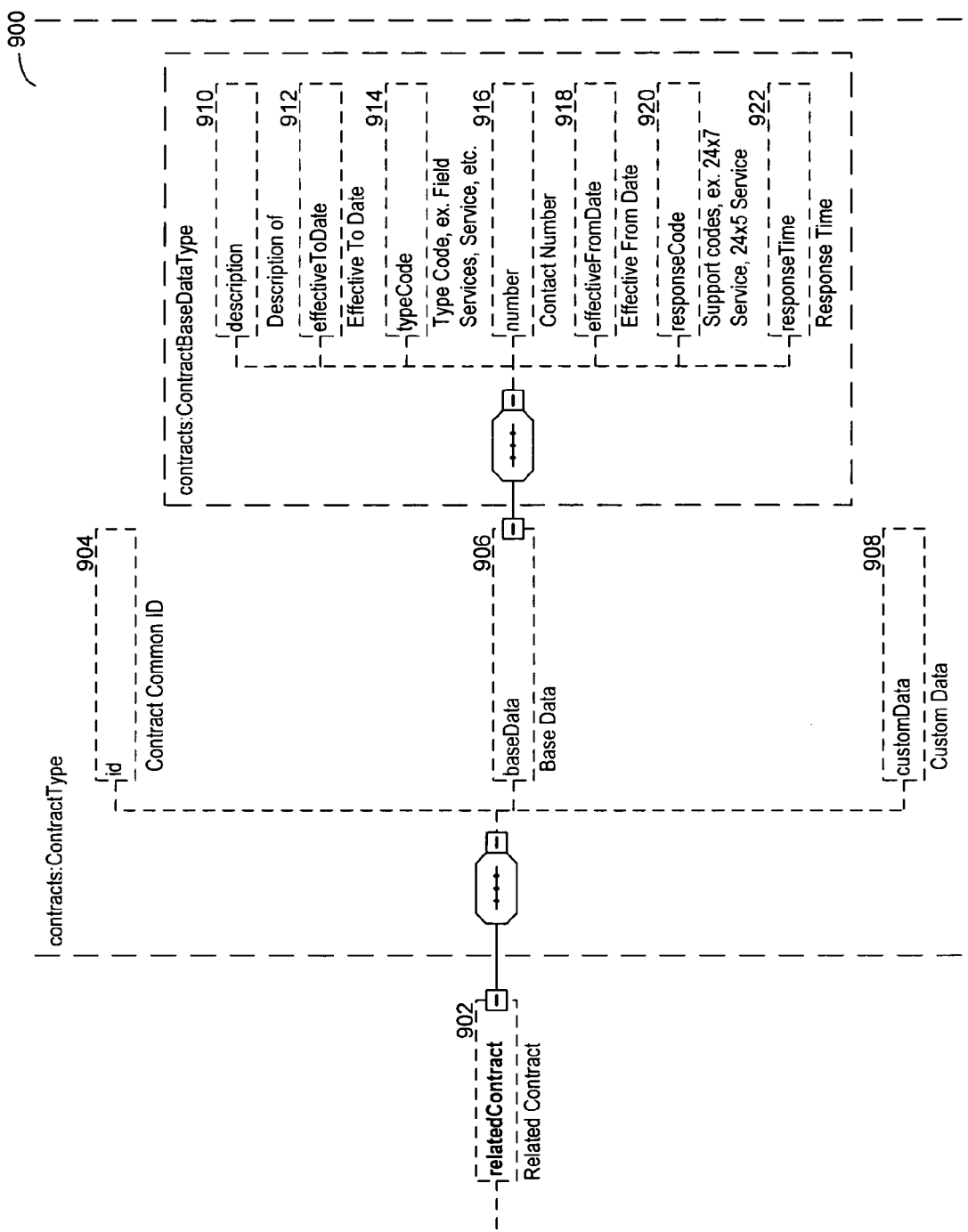

In FIG. 9, the illustrated intermediate data structure 900 is of type service request related contracts. The related contract component 902 may include an ID 904, a related contract base data 906, and a related contract custom data 908. The related contract base data 906 may include the following components:

- Description 910 of the related contract;
- Effective-to date 912 (up to what date is the contract effective);
- Type code 914 (e.g., field services, service, etc.);
- Number 916 (contract number);

Effective-from date 918 (from what date is the contract effective);
Response code 920 (such as support codes, e.g., 24X7, service, e.g., 24X5 service) and
Response time 922.

Figure 10:
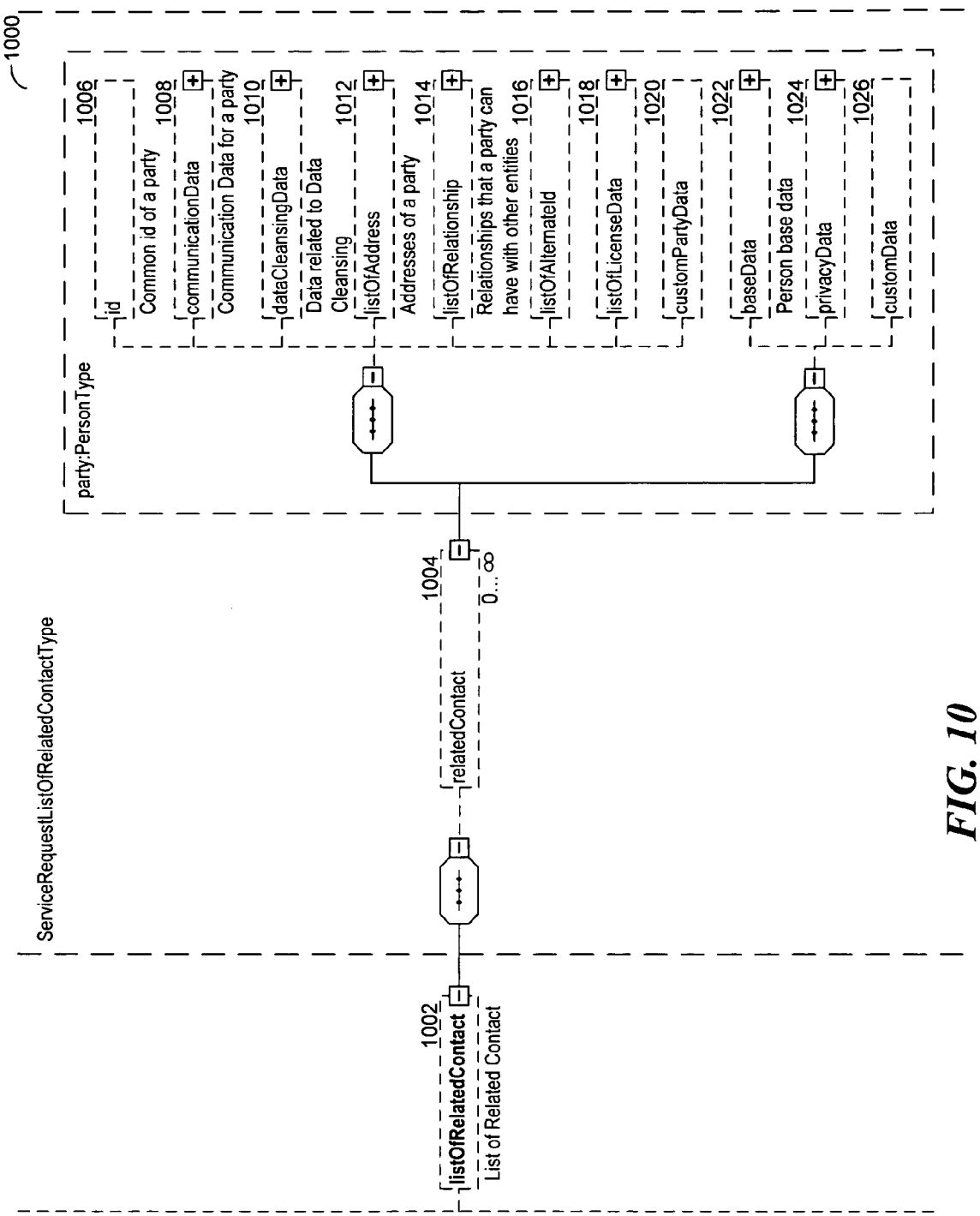

In FIG. 10, the illustrated intermediate data structure 1000 is of type service request list of related contact. The list of related contact component 1002 may include any number of related contacts 1004. Each related contact may include the following components:
ID 1006 (common ID of a party);
Communication data 1008 (communication data for a party);
Data cleansing data 1010 (i.e., data that is related to data cleansing);
List of address 1012 (address of a party);
List of relationship 1014 (relationships that a party can have with other entities);
List of alternate ID 1016;
List of License data 1018;
Custom party data 1020;
Person base data 1022;
Privacy data 1024; and
Custom data 1026 for the related contact.

Figure 11:
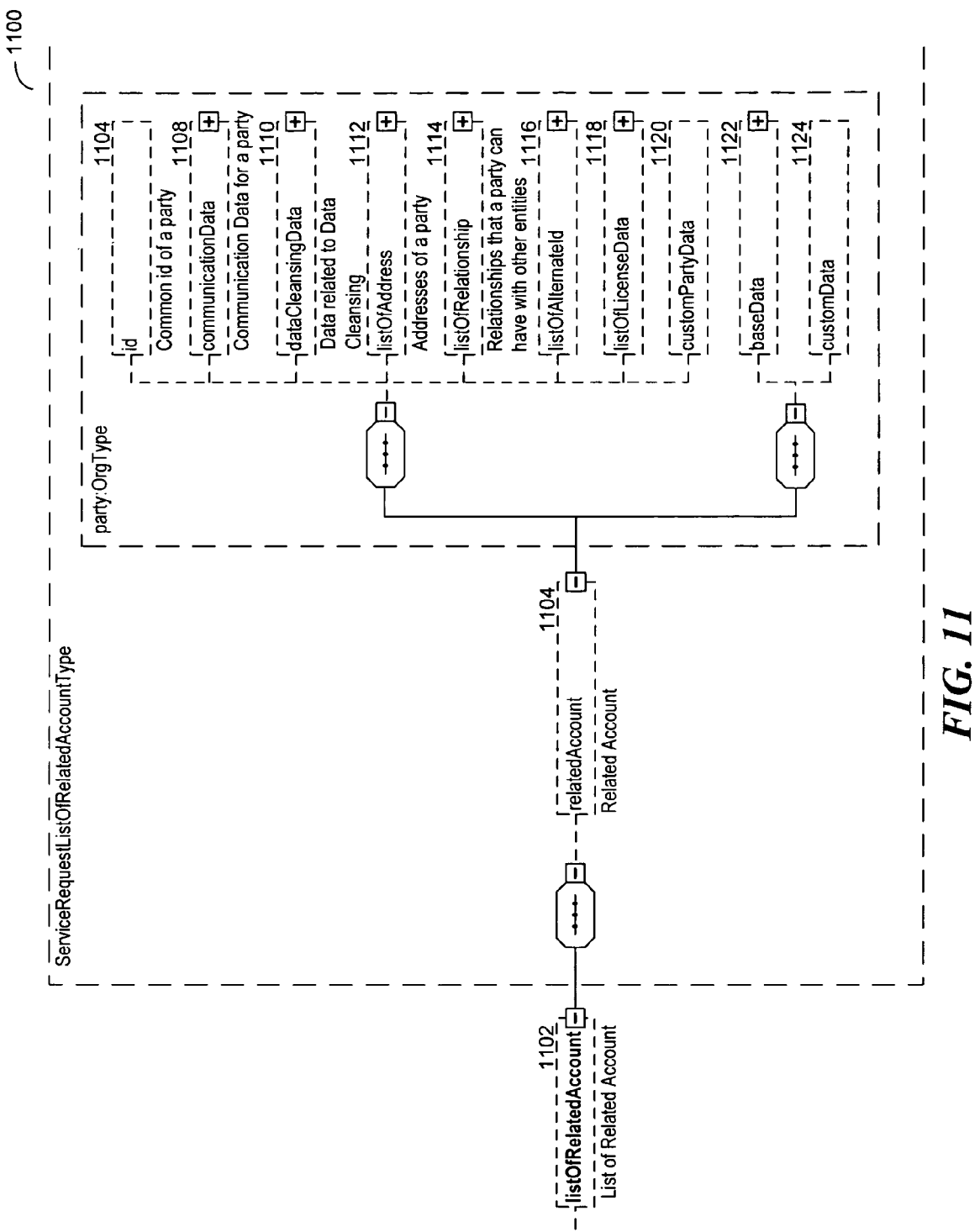
Figure 12:
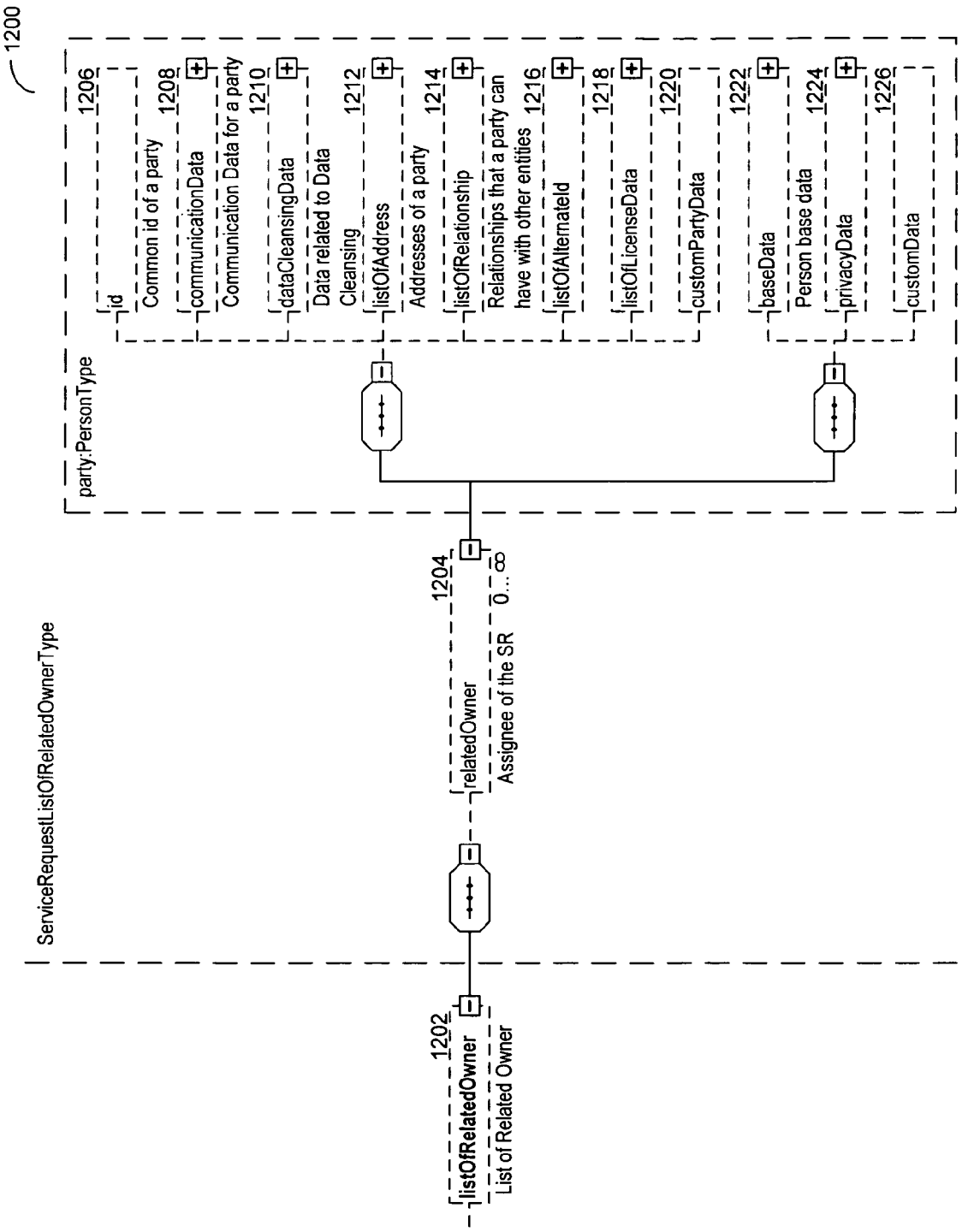

In FIG. 11, the illustrated intermediate data structure 1100 is of type service request list of related account. The list of related account component 1102 may include a related account component 1104, which in turn may include the following components:
ID 1106 (common ID of a party);
Communication data 1108 (communication data for a party);
Data cleansing data 1110 (i.e., data that is related to data cleansing);
List of address 1112 (address of a party);
List of relationship 1114 (relationships that a party can have with other entities);
List of alternate ID 1116;
List of License data 1118;
Custom party data 1120;
Base data 1122; and
Custom data 1124; and In FIG. 12, the illustrated intermediate data structure 1200 is of type service request list of related owner. The list of related owner component 1202 may include any number of related owners 1204 (assignees of the service request). Each related owner may include the following components:
ID 1206 (common ID of a party);
Communication data 1208 (communication data for a party);
Data cleansing data 1210 (i.e., data that is related to data cleansing);
List of address 1212 (address of a party);
List of relationship 1214 (relationships that a party can have with other entities);
List of alternate ID 1216;
List of License data 1218;
Custom party data 1220;
Person base data 1222;
Privacy data 1224; and
Custom data 1226 for the related owner.

Figure 13:
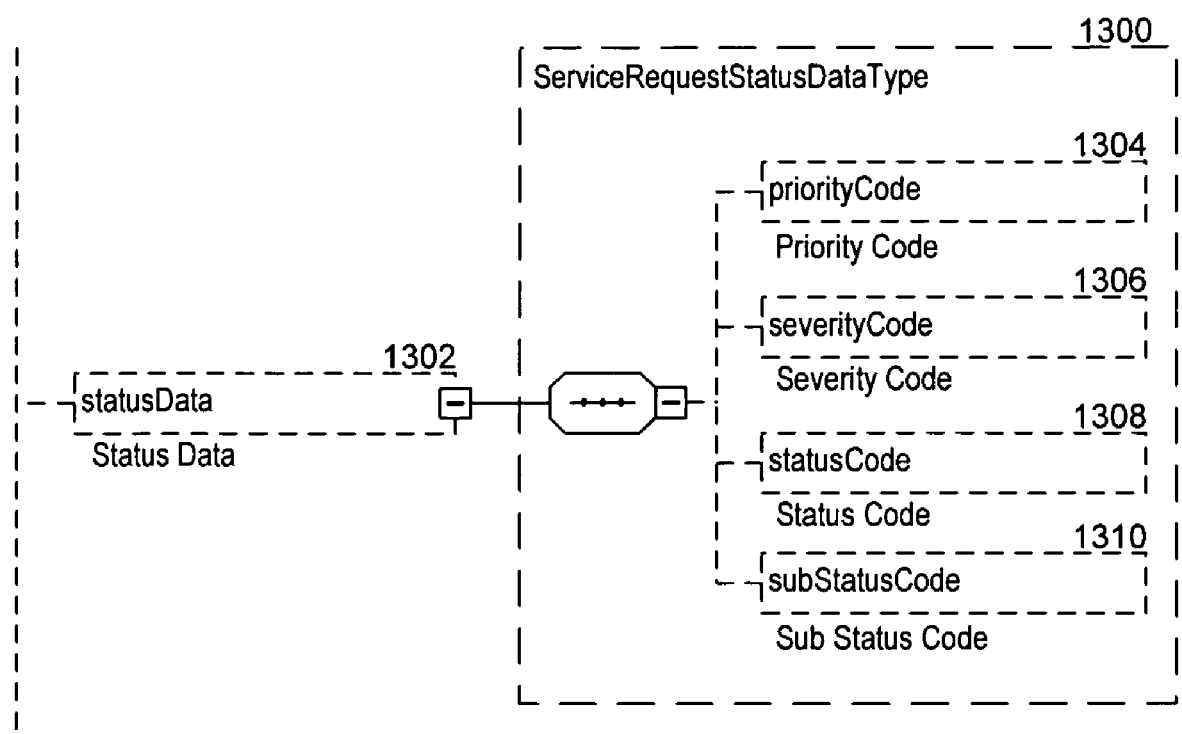

In FIG. 13, the illustrated intermediate data structure 1300 is of type service request status data. The status data component 1302 may include the following components:
Priority code 1304;
Severity code 1306
Status code 1308; and
Sub-status code 1310.

Figure 14:
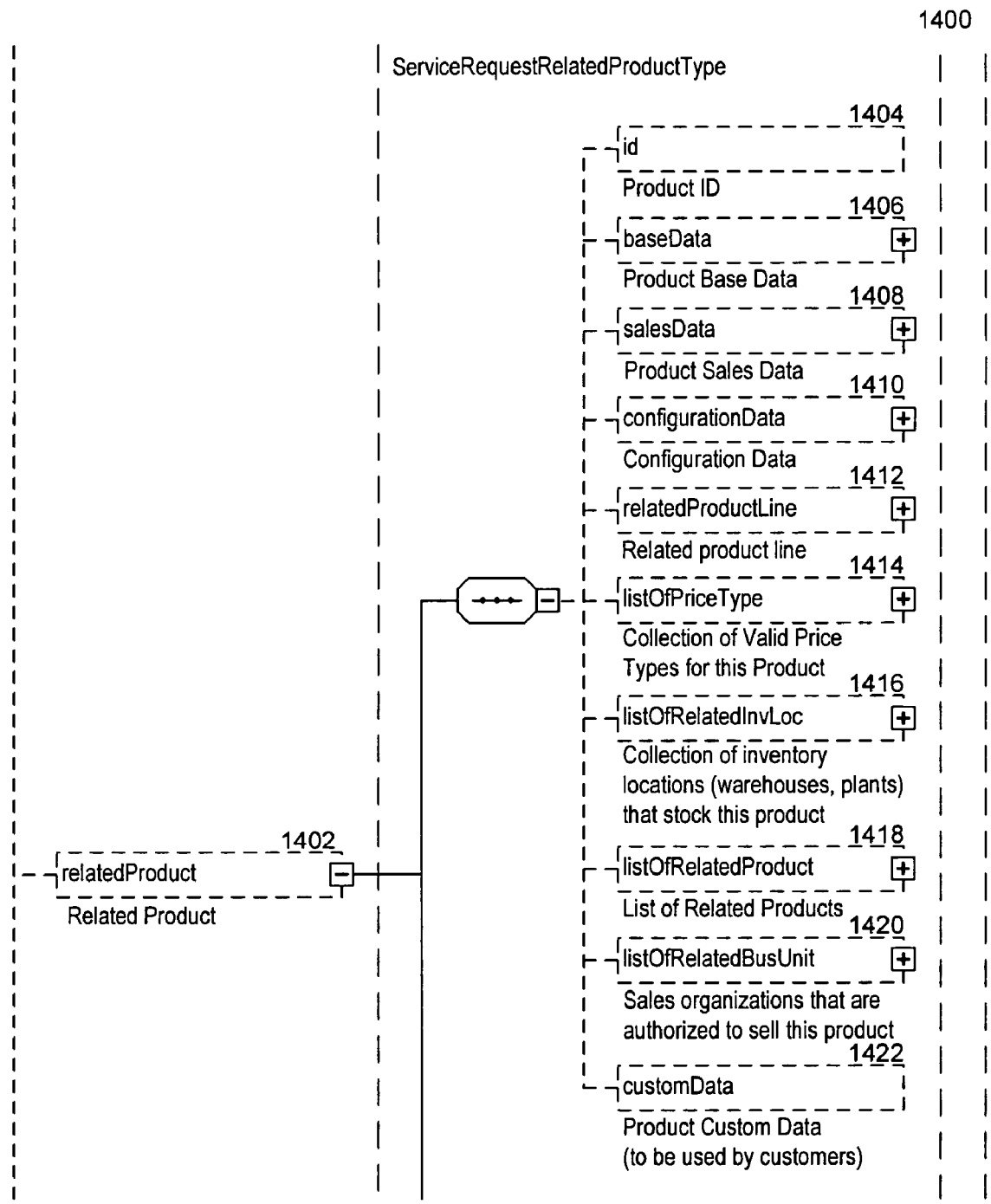

In FIG. 14, the illustrated intermediate data structure 1400 is of type service request related product. The related product component 1402 may include the following components:
ID 1404 (product ID);
Base data 1406 (product base data);
Sales data 1408 (product sales data);
Configuration data 1410;
Related product line 1412;
List of price type 1414 (collection of valid price types for this product);
List of related inventory location 1416 (collection of valid inventory locations e.g. warehouses, plants, that stock this product);
List of related product 1418;
List of related business unit 1420 (sales organizations that are authorized to sell this product); and
Custom data 1422 (product custom data reserved for use by the customer).

Figure 15:
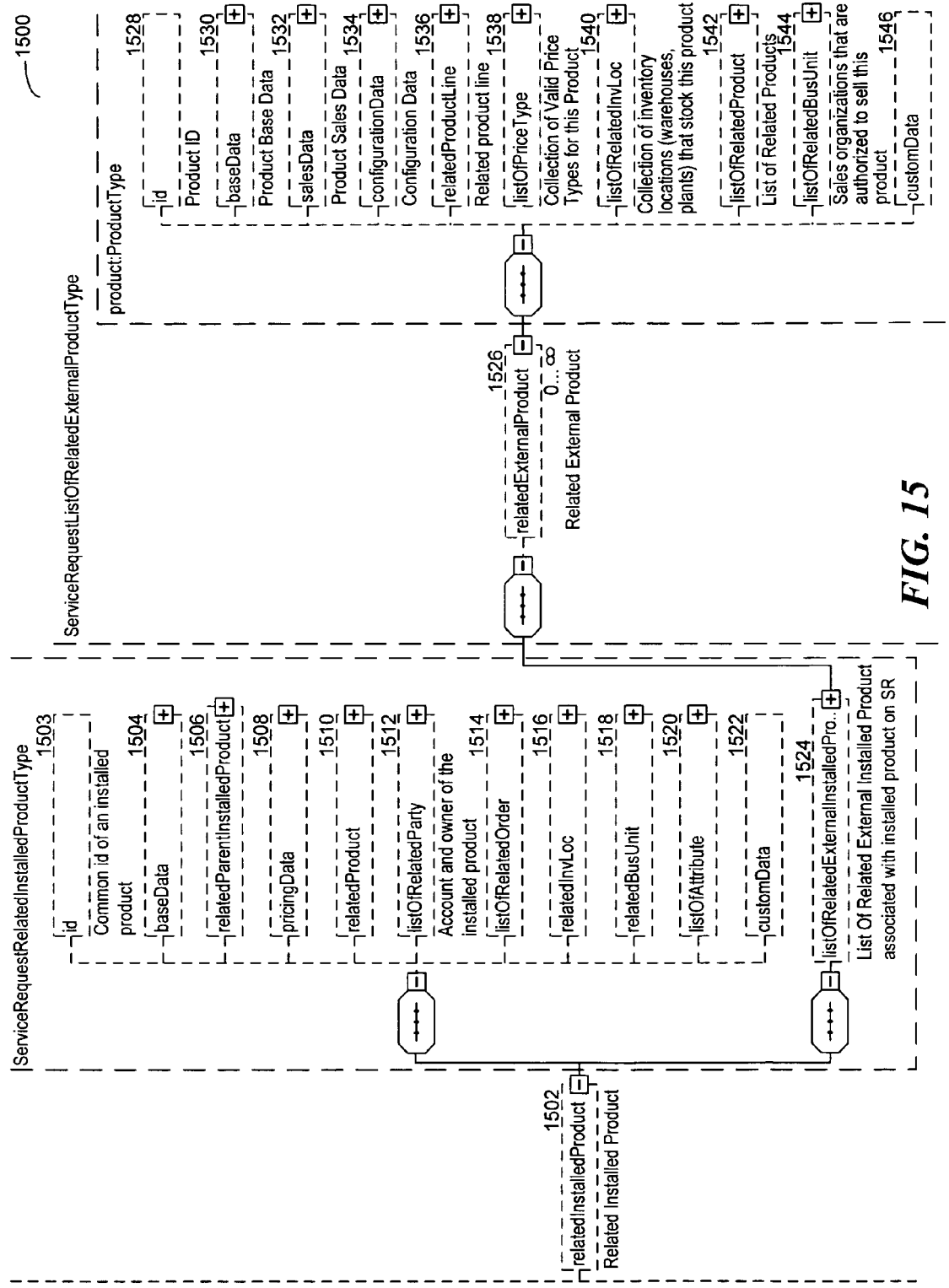

In FIG. 15, the illustrated intermediate data structure 1500 is of type service request related installed product. The related installed product component 1502 may include the following components:
ID 1503 (common ID of an installed product);
Base data 1504;
Related parent installed Product 1506;
Pricing data 1508;
Related product 1510;
List of related party 1512 (account and owner of the installed product);
List of related order 1514;
Related inventory location 1516;
Related business unit 1518;
List of attribute 1520;
Custom data 1522; and
List of related installed product 1524 (list of related external installed products associated with the installed product on the service request).

Further, the list of related installed product may include any number of a related external products 1526. Each related external product 1526 may include the following components:
ID 1528 (product ID);
Base data 1530 (product base data);
Sales data 1532 (product sales data);
Configuration data 1534;
Related product line 1536;
List of price type 1538 (collection of valid price types for this product);
List of related inventory location 1540 (collection of valid inventory locations e.g. warehouses, plants, that stock this product);
List of related product 1542;
List of related business unit 1544 (sales organizations that are authorized to sell this product); and
Custom data 1546 (product custom data reserved for use by the customer).

Figure 16:
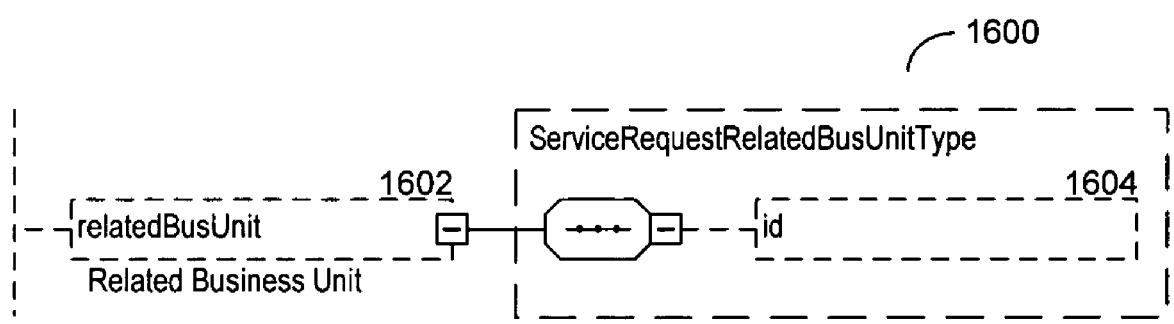

In FIG. 16, the illustrated intermediate data structure 1600 is of type service request related business unit. Service request related business unit 1602 includes an ID component 1604.

Figure 17:
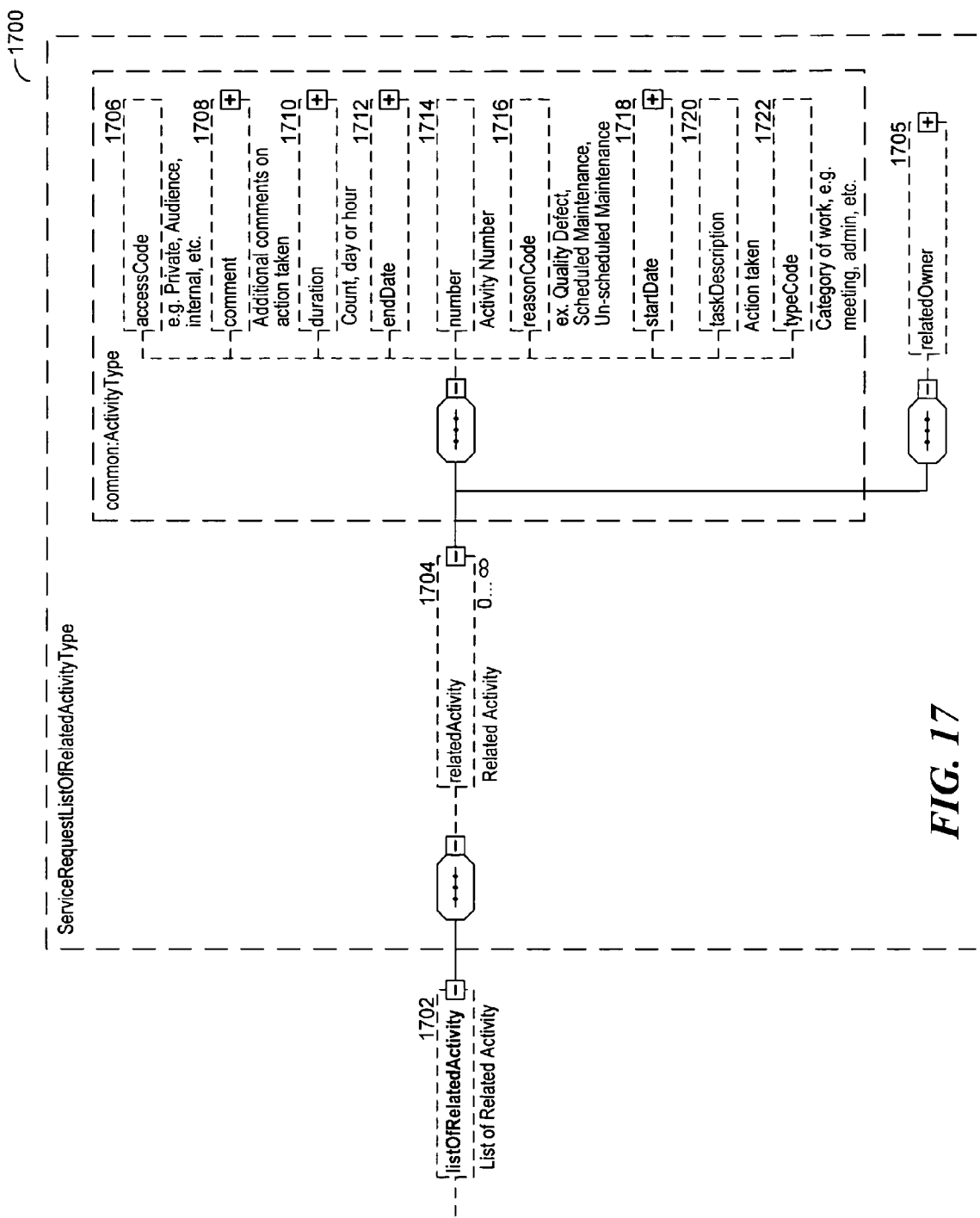

In FIG. 17, the illustrated intermediate data structure 1700 is of type service request list of related activity. The list of related activity component 1702 may include any number of related activities 1704. Each related activity component may include the following components:
Access code 1706 (e.g., private, audience, internal, etc.);

Comment 1708 (additional comments on action taken);
Duration 1710 (e.g., count, day, hour, etc.);
End date 1712;
Number 1714 (activity number);
Reason code 1716 (e.g., quality, defect, scheduled maintenance, un-scheduled maintenance, etc.);
Start date 1718;
Task description 1720 (description of action taken);
Type code 1722 (category of work, e.g., meeting, admin, etc.); and
Related owner 1705.

It will be appreciated by those skilled in the art that the above-described facility may be straightforwardly adapted or extended in various ways. For example, the facility may be used to transform various other kinds of service request information, and may be used to transform service request information between a variety of other formats.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A method in a computing system for managing a service request, the method comprising:
   creating a service request within a first source system, wherein
      the first source system detects a problem requiring service,
      the service request is created in response to the detecting, and
      the service request is created prior to a target system creating a customer-based service request in response to a customer report of the problem;
   extracting service request information in a first source format associated with the first source system, wherein the service request information in the first source format is extracted at least in part from the service request;
   creating a service request object comprising the service request information in the first source format, wherein the first source system and the target system reference the service request object during a course of a resolution of the service request;
   converting the service request information in the first source format into first service request information in an intermediate format;
   converting the first service request information in the intermediate format into service request information in a target format, wherein the target format is associated with the target system;
   extracting service request information in a second source format, wherein the second source format is associated with a second source system, and the second source system is distinct from the first source system;
   converting the service request information in the second source format into second service request information in the intermediate format; and
   integrating the first service request information in the intermediate format and the second service request information in the intermediate format, wherein
   the integrating is performed prior to the converting the first service request information in the intermediate format into the service request information in the target format.

2. The method of claim 1, further comprising:
   using the service request information in the target format to perform at least one computer-implemented act comprising:
      displaying at least part of the service request in the target format, in response to the customer report of the problem.

3. The method of claim 1, wherein the service request object comprises a hierarchy of data components comprising a plurality of service request components, wherein each of the plurality of service request components comprises one or more of:
   a service request common ID component;
   a service request base data component;
   a related parent area component;
   a related root area component;
   a related contract component;
   a list of related contacts component;
   a list of related account component;
   a list of related owner component;
   a status data component;
   a related product component for defining internal and external products;
   a related installed product component for defining customer assets;
   a related business unit component; a list of related activity component; and
   a service request custom data component.

4. The method of claim 3, wherein the service request base data component comprises one or more of:
   an abstract component for summarizing the service request;
   a channel source code component;
   a closed date component for defining when the service request is closed;
   a commit time component;
   a description component;
   a service request number component; and
   a reported date component.

5. The method of claim 3, wherein the related parent area component comprises a parent area component, wherein the parent area component comprises one or more of:
   a functional area common ID component;
   a base data component that can comprise a functional area name component;
   a list of related sub-areas component that can comprise any number of related sub-area components; and
   a functional area custom data component.

6. The method of claim 3, wherein the related root area component comprises a common ID for functional area.

7. The method of claim 3, wherein the related contract component comprises one or more of:
   a contract common ID component; and
   a contract base data component, wherein the contract base data component comprises one or more of:
      a related contract description component;
      an effective-to date component;
      a type code component;
      a contract number component;
      an effective-from date component;
      a response code component;

a response time component; and
a related contract custom data component.

8. The method of claim 3, wherein the list of related contact component comprises a plurality of related contact components, wherein each of the plurality of related contact components comprises one or more of:
a common ID for a party component;
a communication data for a party component;
a data cleansing data component;
a list of address of a party component;
a list of relationships that a party can have with other entities component;
a list of alternate ID component;
a list of license data component;
a custom party data component;
a person base data component;
a privacy data component; and
a related contact custom data component.

9. The method of claim 3, wherein the list of related account component comprises a plurality of related account components, wherein each of the plurality of related account components comprises one or more of:
a common ID for a party component;
a communication data for a party component;
a data cleansing data component;
a list of address of a party component;
a list of relationships that a party can have with other entities component;
a list of alternate ID component;
a list of license data component;
a custom party data component;
a party base data component; and
a related contact custom data component.

10. The method of claim 3, wherein the list of related owner component comprises a plurality of related owner components, wherein each of the plurality of related owner components comprise one or more of:
a common ID for a party component;
a communication data for a party component;
a data cleansing data component;
a list of address of a party component;
a list of relationships that a party can have with other entities component;
a list of alternate ID component;
a list of license data component;
a custom party data component;
a person base data component;
a privacy data component; and
a related contact custom data component.

11. The method of claim 3, wherein the status data component comprises one or more of:
a priority code component;
a severity code component;
a status code component; and
a sub-status code component.

12. The method of claim 3, wherein the related product component comprises one or more of:
a product ID component;
a product base data component;
a product sales data component;
a configuration data component;
a related product line component;
a list of price type component;
a list of related inventory location component;
a list of related product component;
a list of related business unit component; and
a product custom data component.

13. The method of claim 3, wherein the related installed product component comprises one or more of:
a common ID of an installed product component;
an installed product base data component;
a related parent installed product component;
a pricing data component;
a related product component a list of related party component;
a list of related order component;
a related inventory location component;
a related business unit component;
a list of attribute component;
a custom data component; and
a list of related installed product component, wherein the list of related installed product component comprises one or more of:
an external product ID component;
an external product base data component;
an external product sales data component;
an external product configuration data component;
an external product related product line component;
an external product list of price type component;
an external product list of related inventory location component;
an external product list of related product component;
an external product list of related business unit component; and
an external product custom data component.

14. The method of claim 3, wherein the related business unit component comprises a related business unit common ID.

15. The method of claim 3, wherein the list of related activity component comprises a plurality of related activity components, wherein each of the plurality of related activity components comprise one or more of:
an access code component;
a comment on action taken component;
a duration component;
an end date component;
an activity number component;
a reason code component;
a start date component;
a task description of action taken component;
a type code component; and
a related owner component.

16. The method of claim 1, wherein
the service request comprises a report of a loss of a service for the customer.

17. One or more non-transitory computer-readable storage mediums carrying one or more sequences of instructions for managing a service request, wherein execution of the one or more sequences of instructions by one or more processors causes the one or more processors to perform:
creating a service request within a first source system, wherein
the source system detects a problem requiring service,
the service request is created in response to the detecting, and
the service request is created prior to a target system creating a customer-based service request in response to a customer report of the problem;
extracting service request information in a first source format associated with the source system, wherein
the service request information in the first source format is extracted at least in part from the service request;
creating a service request object comprising the service request information in the first source format, wherein the first source system and the target system reference the service request object during a course of a resolution of the service request;

converting the service request information in the first source format into first service request information in an intermediate format;

converting the first service request information in the intermediate format into service request information in a target format, wherein the target format is associated with the target system;

extracting service request information in a second source format, wherein the second source format is associated with a second source system, and the second source system is distinct from the first source system;

converting the service request information in the second source format into second service request information in the intermediate format; and integrating the first service request information in the intermediate format and the second service request information in the intermediate format, wherein the integrating is performed prior to the converting the first service request information in the intermediate format into the service request information in the target format.

18. The one or more non-transitory computer-readable storage mediums of claim 17, further comprising:

using the service request information in the target format to perform at least one computer-implemented act comprising:

displaying at least part of the service request in the target format, in response to the customer report of the problem.

19. A system, comprising:

one or more processors; and one or more non-transitory computer-readable storage mediums coupled to the one or more processors, wherein the one or more non-transitory computer-readable storage mediums comprise computer instructions that when executed cause the one or more processors to perform:

creating a service request within a first source system, wherein the first source system detects a problem requiring service, the service request is created in response to the detecting, and the service request is created prior to a target system creating a customer-based service request in response to a customer report of the problem, extracting service request information in a first source format associated with the first source system, wherein the service request information in the first source format is extracted at least in part from the service request, creating a service request object comprising the service request information in the first source format, wherein the first source system and the target system reference the service request object during a course of a resolution of the service request, converting the service request information in the first source format into first service request information in an intermediate format, converting the first service request information in the intermediate format into service request information in a target format, wherein the target format is associated with the target system, extracting service request information in a second source format, wherein the second source format is associated with a second source system, and the second source system is distinct from the first source system, converting the service request information in the second source format into second service request information in the intermediate format, and integrating the first service request information in the intermediate format and the second service request information in the intermediate format, wherein the integrating is performed prior to the converting the first service request information in the intermediate format into the service request information in the target format.

20. The system of claim 19, wherein the service request object comprises a hierarchy of data components comprising a plurality of service request components, wherein each of the plurality of service request components comprises one or more of:

a service request common ID component;
a service request base data component;
a related parent area component;
a related root area component; a related contract component;
a list of related contacts component;
a list of related account component;
a list of related owner component;
a status data component;
a related product component for defining internal and external products;
a related installed product component for defining customer assets;
a related business unit component;
a list of related activity component; and
a service request custom data component.

21. The system of claim 20, wherein the service request base data component comprises one or more of:

an abstract component for summarizing the service request;
a channel source code component;
a closed date component for defining when the service request is closed;
a commit time component;
a description component;
a service request number component; and
a reported date component.

22. The system of claim 20, wherein the related parent area component comprises a parent area component, wherein the parent area component comprises one or more of:

a functional area common ID component;
a base data component that can comprise a functional area name component;
a list of related sub-areas component that can comprise any number of related sub-area components; and
a functional area custom data component.

23. The system of claim 20, wherein the related root area component comprises a common ID for functional area.

24. The system of claim 20, wherein the related contract component comprises one or more of:

a contract common ID component; and
a contract base data component, wherein contract base data component comprises one or more of:
a related contract description component;
an effective-to date component;
a type code component;
a contract number component;

an effective-from date component;
a response code component;
a response time component; and
a related contract custom data component.

25. The system of claim 20, wherein the list of related contact component comprises a plurality of related contact components, wherein each of the plurality of related contact components comprises one or more of:
   a common ID for a party component;
   a communication data for a party component;
   a data cleansing data component;
   a list of address of a party component;
   a list of relationships that a party can have with other entities component;
   a list of alternate ID component;
   a list of license data component;
   a custom party data component;
   a person base data component;
   a privacy data component; and
   a related contact custom data component.

26. The system of claim 20, wherein the list of related account component comprises a plurality of related account components, wherein each of the plurality of related account components comprises one or more of:
   a common ID for a party component;
   a communication data for a party component;
   a data cleansing data component;
   a list of address of a party component;
   a list of relationships that a party can have with other entities component;
   a list of alternate ID component;
   a list of license data component;
   a custom party data component;
   a party base data component; and
   a related contact custom data component.

27. The system of claim 20, wherein the list of related owner component comprises a plurality of related owner components, wherein each of the plurality of related owner components comprise one or more of:
   a common ID for a party component;
   a communication data for a party component;
   a data cleansing data component;
   a list of address of a party component;
   a list of relationships that a party can have with other entities component;
   a list of alternate ID component;
   a list of license data component;
   a custom party data component;
   a person base data component;
   a privacy data component; and
   a related contact custom data component.

28. The system of claim 20, wherein the status data component comprises one or more of:
   a priority code component;
   a severity code component;
   a status code component; and
   a sub-status code component.

29. The system of claim 20, wherein the related product component comprises one or more of:
   a product ID component;
   a product base data component;
   a product sales data component;
   a configuration data component;
   a related product line component;
   a list of price type component;
   a list of related inventory location component;
   a list of related product component;
   a list of related business unit component; and
   a product custom data component.

30. The system of claim 20, wherein the related installed product component comprises one or more of:
   a common ID of an installed product component;
   an installed product base data component;
   a related parent installed product component; a pricing data component; a related product component a list of related party component; a list of related order component; a related inventory location component; a related business unit component; a list of attribute component; a custom data component; and a list of related installed product component, wherein the list of related installed product component comprises one or more of:
      an external product ID component; an external product base data component; an external product sales data component; an external product configuration data component; an external product related product line component; an external product list of price type component; an external product list of related inventory location component; an external product list of related product component; an external product list of related business unit component; and an external product custom data component.

31. The system of claim 20, wherein the related business unit component comprises a related business unit common ID.

32. The system of claim 20, wherein the list of related activity component comprises a plurality of related activity components, wherein each of the plurality of related activity components comprises one or more of:
   an access code component;
   a comment on action taken component;
   a duration component;
   an end date component;
   an activity number component;
   a reason code component;
   a start date component;
   a task description of action taken component;
   a type code component; and
   a related owner component.

* * * * *

UNITED STATES PATENT AND TRADEMARK OFFICE
CERTIFICATE OF CORRECTION

| | | |
|---|---|---|
| PATENT NO. | : 7,912,932 B2 | Page 1 of 2 |
| APPLICATION NO. | : 10/809927 | |
| DATED | : March 22, 2011 | |
| INVENTOR(S) | : Barnes-Leon et al. | |

It is certified that error appears in the above-identified patent and that said Letters Patent is hereby corrected as shown below:

On face page, in column 2, under "Abstract", line 4, delete "an" and insert -- a --, therefor.

On page 2, in column 2, under "Other Publications" in line 12, Delete "entriched ifnormation" and insert -- enriched information --, therefor.

On page 2, in column 2, under "Other Publications", line 15, Delete "Conventry:" and insert -- Coventry: --, therefor.

In column 6, line 66, delete "an" and insert -- a --, therefor.

In column 10, line 13, after "locations" insert -- , --.

In column 14, line 6-8, in Claim 13, delete "a pricing data component;
a related product component a list of related party component;" and
insert -- a pricing data component;
a related product component;
a list of related party component; --, therefor.

In column 16, line 3-6, in Claim 19, delete "extracting service request information in a second source format, wherein the second source format is associated with a second source system, and the second source system is distinct from the first source system," and insert -- extracting service request information in a second source format, wherein the second source format is associated with a second source system, **and
the** second source system is distinct from the first source system, --, therefor.

Signed and Sealed this
Eleventh Day of October, 2011

David J. Kappos
*Director of the United States Patent and Trademark Office*

CERTIFICATE OF CORRECTION (continued)
U.S. Pat. No. 7,912,932 B2

In column 18, line 15-36, In Claim 30, delete "The system of claim 20, wherein the related installed product component comprises one or more of:
a common ID of an installed product component;
an installed product base data component;
a related parent installed product component; a pricing data component; a related product component a list of related party component; a list of related order component; a related inventory location component; a related business unit component; a list of attribute component; a custom data component; and a list of related installed product component, wherein the list of related installed product component comprises one or more of: an external product ID component; an external product base data component; an external product sales data component; an external product configuration data component; an external product related product line component; an external product list of price type component; an external product list of related inventory location component; an external product list of related product component; an external product list of related business unit component; and an external product custom data component."
and
insert -- The system of claim 20, wherein the related installed product component comprises one or more of:
a common ID of an installed product component;
an installed product base data component;
a related parent installed product component;
a pricing data component;
a related product component;
a list of related party component;
a list of related order component;
a related inventory location component;
a related business unit component; a list of attribute component;
a custom data component; and
a list of related installed product component, wherein
the list of related installed product component comprises one or more of:
an external product ID component;
an external product base data component;
an external product sales data component;
an external product configuration data component;
an external product related product line component;
an external product list of price type component;
an external product list of related inventory location component;
an external product list of related product component;
an external product list of related business unit component;
and an external product custom data component. --, therefor.